US010152356B2

(12) United States Patent
Raikov et al.

(10) Patent No.: US 10,152,356 B2
(45) Date of Patent: Dec. 11, 2018

(54) METHODS AND APPARATUS FOR LIMITING DATA TRANSFERRED OVER THE NETWORK BY INTERPRETING PART OF THE DATA AS A METAPROPERTY

(71) Applicant: VMware, Inc., Palo Alto, CA (US)

(72) Inventors: Ventsyslav Raikov, Sofia (BG); Lazarin Lazarov, Sofia (BG); Boris Savov, Sofia (BG); Rostislav Georgiev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 42 days.

(21) Appl. No.: 15/371,450

(22) Filed: Dec. 7, 2016

(65) Prior Publication Data

US 2018/0157538 A1    Jun. 7, 2018

(51) Int. Cl.
| | |
|---|---|
| G06F 9/46 | (2006.01) |
| G06F 9/50 | (2006.01) |
| G06F 9/455 | (2018.01) |
| G06F 8/61 | (2018.01) |
| G06F 9/445 | (2018.01) |

(52) U.S. Cl.
CPC ............. *G06F 9/5077* (2013.01); *G06F 8/61* (2013.01); *G06F 9/45558* (2013.01); *G06F 9/44505* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,171,482 B1 * | 5/2012 | Vlaovic | G06F 8/71 |
| | | | 717/148 |
| 8,171,485 B2 | 5/2012 | Muller | |
| 2012/0102170 A1 | 4/2012 | Hiltunen et al. | |
| 2013/0304788 A1 | 11/2013 | DeLuca et al. | |
| 2014/0181816 A1 | 6/2014 | Muller et al. | |
| 2015/0186132 A1 | 7/2015 | Oliveri et al. | |
| 2017/0083292 A1 | 3/2017 | McLaughlan et al. | |

OTHER PUBLICATIONS

Bijjahalli, "vRealize Automation 7.0—New Event Broker Enhances Lifecycle Extensibility", Nov. 2, 2015, 4 pages.
United States Patent and Trademark Office, "Non-Final Office Action," issued in connection with U.S. Appl. No. 15/371,474, dated Oct. 18, 2018, 36 pages.
United States Patent and Trademark Office, "Non-Final Office Action," issued in connection with U.S. Appl. No. 15/371,545, dated Sep. 19, 2018, 20 pages.

* cited by examiner

*Primary Examiner* — Gregory A Kessler
(74) *Attorney, Agent, or Firm* — Hanley, Flight & Zimmerman, LLC

(57) ABSTRACT

Methods and apparatus to customize deployment using metaproperties are disclosed. An example deployment metaproperty manager can generate a first metaproperty payload including an initial application component metaproperty of an application component that provides a logical template of an application. A deployment event broker can reply-back to the deployment metaproperty manager with a second metaproperty payload that includes a processed application component metaproperty.

14 Claims, 17 Drawing Sheets

METHODS AND APPARATUS FOR LIMITING DATA TRANSFERRED OVER THE NETWORK BY INTERPRETING PART OF THE DATA AS A METAPROPERTY

FIELD OF THE DISCLOSURE

The present disclosure relates generally to cloud computing and, more particularly, to methods and apparatus to limit data transferred over the network by interpreting part of the data as a metaproperty in deployment provisioning.

BACKGROUND

Virtualizing computer systems provide benefits such as the ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Figure 1A:
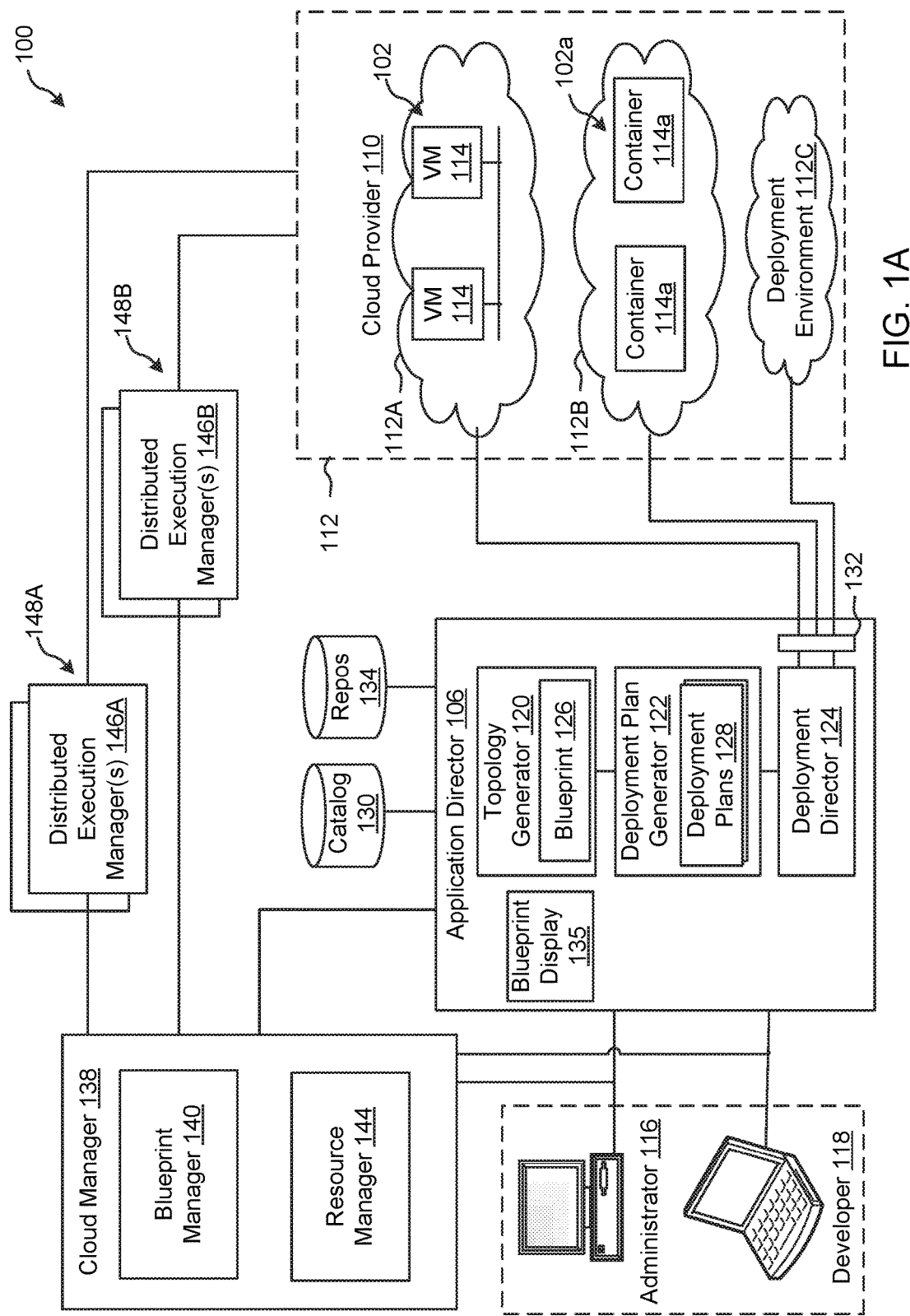
FIGS. 1A-1C depict an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vRealize Orchestrator (vRO) from VMware®, the vRealize Automation Cloud Automation Software from VMware®), interfaces, portals, etc. disclosed herein may be utilized individually and/or in any combination. For example, all or a subset of the described improvements may be utilized.

As used herein, "availability" refers to the level of redundancy required to provide the continuous operation expected for the workload domain. As used herein, "performance" refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, "capacity" refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full "virtualization", as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

"Paravirtualization", as used herein, is a virtualization environment in which hardware resources are managed by a hypervisor to provide virtual hardware resources to a virtual machine, and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

"Operating system virtualization" is also referred to herein as container virtualization. As used herein, "operating system virtualization" refers to a system in which processes are isolated in an operating system. In a typical operating system virtualization system, a host operating system is installed on the server hardware. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Figure 1B:
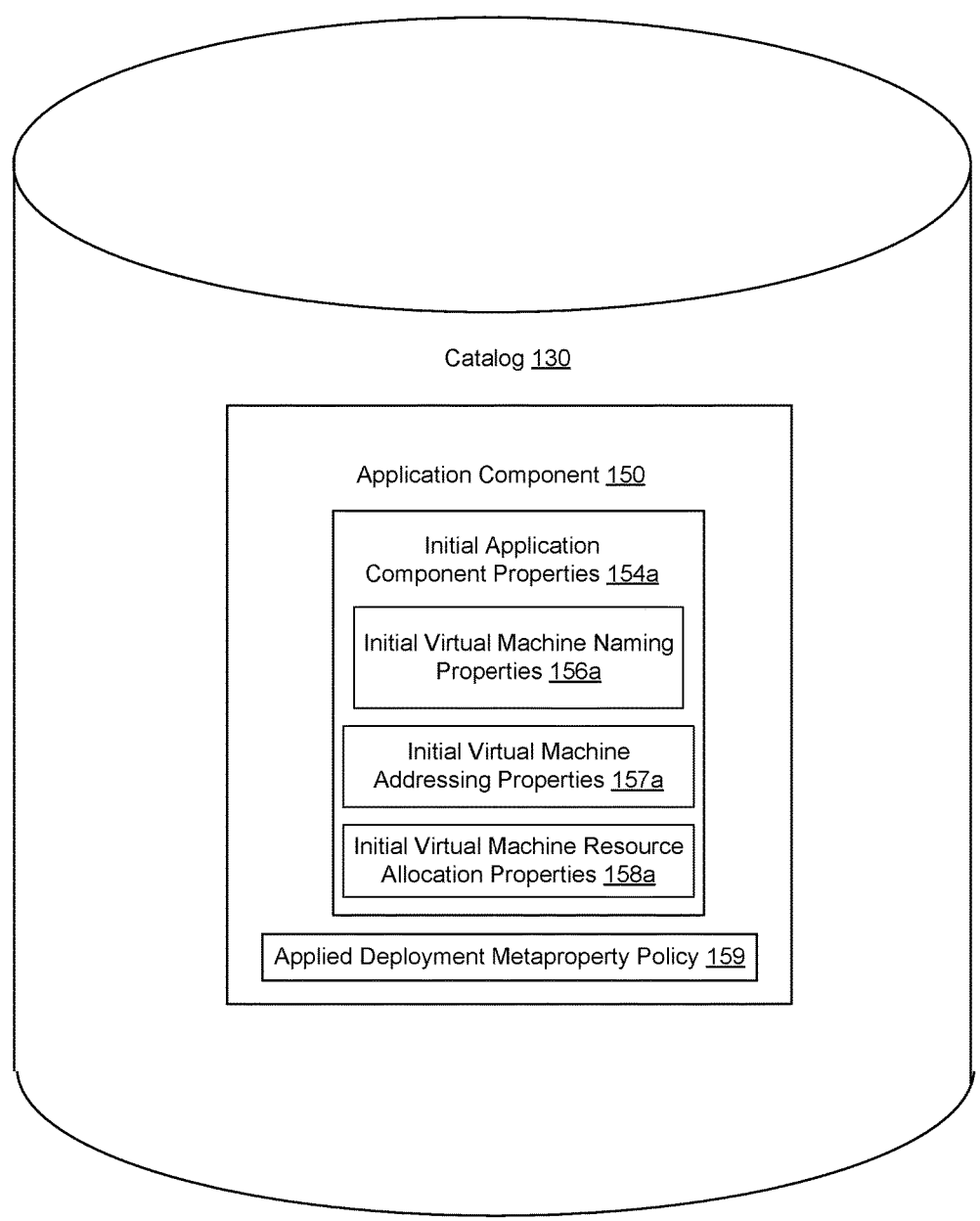
Figure 1C:
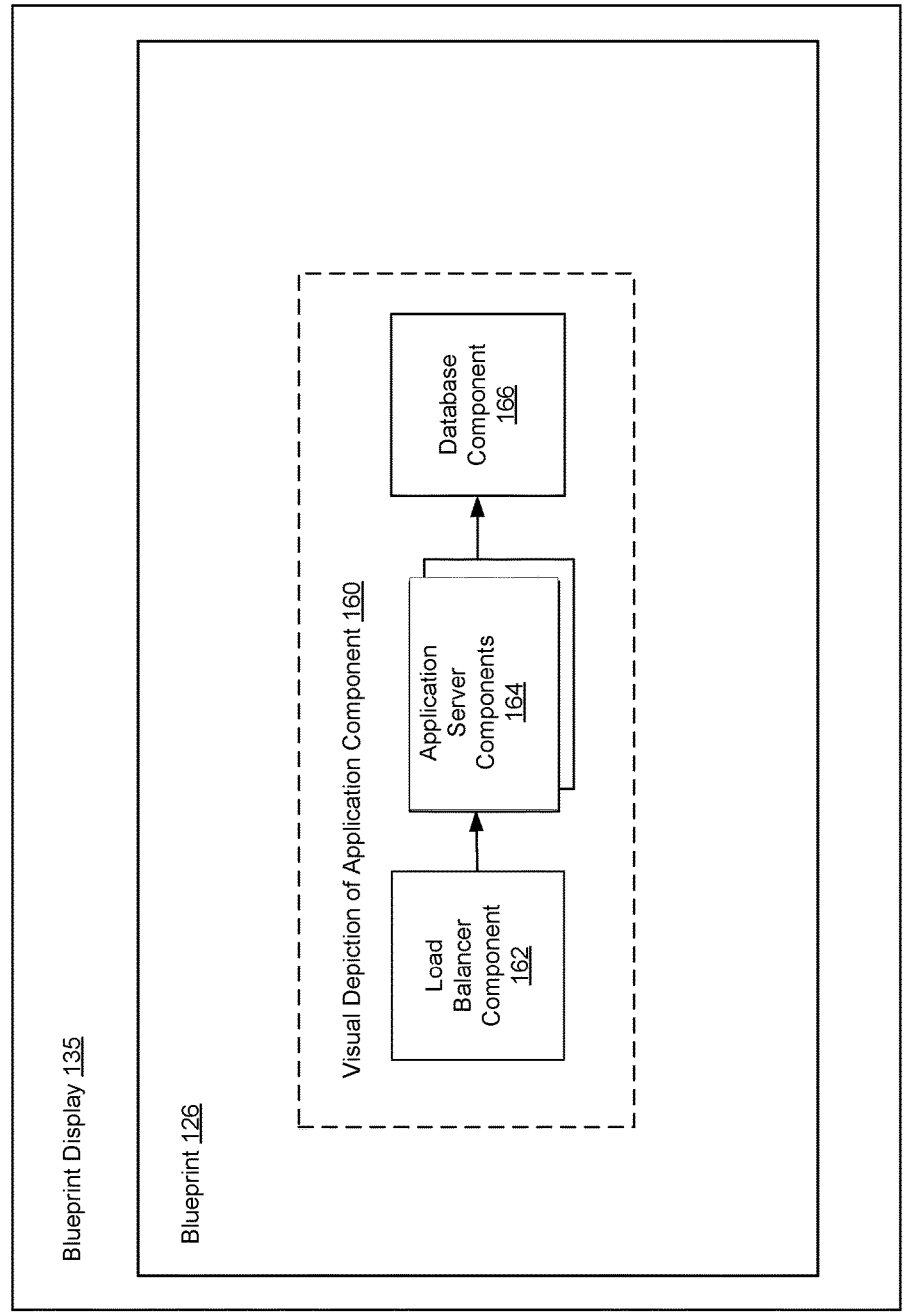

FIGS. 1A-1C depict an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1A includes multiple VMs 114. The example VMs 114 of FIG. 1A provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies one or more other ones of the VMs 114.

As illustrated in FIG. 1A, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vRealize Orchestrator (vRO) and/or vRealize Automation (vRA) API and a vCloud Director API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112A of FIG. 1A is vCloud DataCenter cloud computing services available from VMware, Inc.

In some examples disclosed herein, a lighter-weight virtualization is employed by using containers instead of VMs 114 as shown in the development environment 112B. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112B.

The example application director 106 of FIG. 1A, which may be running in one or more VMs, orchestrates deployment of multi-tier applications onto one of the example deployment environments 112A, 112B, 112C. As illustrated in FIG. 1A, the example application director 106 includes a topology generator 120, a deployment plan generator 122, and a deployment director 124.

The example topology generator 120 generates a basic blueprint 126 of FIG. 1A that specifies a logical topology of an application to be deployed. The example basic blueprint 126 generally captures the structure of an application as a collection of application components executing on virtual computing resources. An example online store application basic blueprint 126 generated by the example topology generator 120 may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including of one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1A may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example of FIG. 1B shows a more detailed view of example catalog 130, explicitly showing for example Application Component 150 including Initial Application Component Properties 154a and Applied Deployment Metaproperty Policy 159. Examples of Application Component Properties 154a shown in FIG. 1B include an Initial Virtual Machine Naming Property, an Initial Virtual Machine Addressing Property, and an Initial Virtual Machine Resource Allocation Property. In other examples: the example Initial Virtual Machine Naming Property can be plural examples of Initial Virtual Machine Naming Properties 156a, an example Initial Virtual Machine Addressing Property can be plural examples of Initial Virtual Machine Addressing Properties 157a, and an example Initial Virtual Machine Resource Allocation Property can be plural examples of Initial Virtual Machine Resource Allocation Properties 158a. The forgoing are related to VM's. For example, the Initial Virtual Machine Resource Allocation Properties 158a can be broadly directed to examples such as an initial Central Processing Unit (CPU) allocation property for VM's, and an initial memory allocation property for VM's, etc.

As will be discussed in greater detail subsequently, there is a customization need to generate one or more Processed Application Component Properties based on one or more of the Initial Application Component Properties. However, it may be overly burdensome on computation resources to directly customize and/or modify (e.g. process) Initial Application Component Properties into Processed Application Component Properties. In examples of this disclosure, indirect processing using metaproperties can achieve the desired result of one or more Processed Application Component Properties, while limiting burden on computational resources.

Numerosity of the Initial Application Component Properties 154a can be very large. For example, the number of the Initial Application Component Properties 154a can be substantially greater than one hundred Initial Application Component Properties 154a. Furthermore, customization or modification of all of the initial application component properties 154a using event notifications and schema of an event broker could create an amount of data that is so large as to be impractical as it excessively loads down computing system resources (e.g. database reads, network traffic, processing etc.). First, this loading is because of the numerosity of the Initial Application Component Properties 154a. Moreover, this loading is because large data structures having variable-length elements like an array of properties (e.g. key-value pairs) would be used by the schema of the event broker in event notifications. Such event notifications would be needed for deployment customization and/or modification (e.g. processing) of the Initial Application Component Properties 154a into Processed Application Component Properties. Accordingly, there is a compelling need to find some way to limit data transferred over the network in deployment provisioning.

As will be discussed in greater detail subsequently herein with particular reference to the examples of FIGS. 4F and 4G, in response to this compelling need, examples of this disclosure can interpret part of the numerous Initial Application Component Properties 154a as an Initial Application Component Metaproperty. By operating on a more limited data volume of the Initial Application Component Metaproperty for deployment customization and/or modification, rather than operating directly on the numerous Initial Application Component Properties 154a, examples of this disclosure can limit data volume, and so reduce and/or limit loading down of computing system resources (e.g. database reads, network traffic, processing etc.). As will be discussed in greater detail subsequently in examples of this disclosure, example Deployment Metaproperty Schema 434 of Deployment Metaproperty Topic 433 of Deployment Event Broker 430b can use a data structure having a variable-length element like a property array or metaproperty array (e.g. key-value pair) in First and Second Metaproperty Payloads for the respective Initial Application Component Metaproperty and Processed Application Component Metaproperty, as shown for example in FIG. 5. After the Deployment Event Broker 430b replies back to the Metaproperty Manager Service 420b with the Processed Application Component Metaproperty, the Metaproperty Manager Service 420b can use the Processed Application Component Metaproperty to generate a Processed Application Component Property (based upon the Processed Application Component Metaproperty). The result of the Processed Application Component Property can then provide for the deployment customization of the Application Component 150, while also having reduced and/or limited loading down of computing system resources (e.g. database reads, network traffic, processing etc.) in the operations of the example of this disclosure, which provide the result of the result of the Processed Application Component Property.

More generally, the example catalog 130 in FIG. 1B may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1A generates a deployment plan 128 based on the basic blueprint 126 that includes deployment settings (e.g., virtual computing resources' cluster size, CPU, memory, networks, etc.) and an execution plan of tasks. The execution plan specifies an order in which virtual computing resources are provisioned and application components are installed, configured, and started. The example deployment plan 128 of FIG. 1A provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112A, 112B. 112C, etc. (e.g., for testing, staging, production). In this example the deployment plan 128 is separated and distributed as a series of local deployment plans having a series of tasks to be executed by the VMs 114 provisioned from the deployment environment 112A. Each VM 114 coordinates execution of each task with a centralized deployment module (e.g., the deployment director 124) to ensure that tasks are executed in an order that complies with dependencies specified in the application blueprint 126. The Application Director 106 can generate a Blueprint Display 135, as shown in FIG. 1A and as shown for example in greater detail in FIG. 1C. In the example of FIG. 1C, the Blueprint Display 135 displays an example Blueprint 126 showing for example a Visual Depiction of Application Component 160. In the example of FIG. 1C, the Application Component includes an example Load Balancer Component 162 topologically coupled with example Application Server Components 164 topologically coupled with Database Component 166.

The example deployment director 124 of FIG. 1A executes the deployment plan 128 by communicating with the cloud computing platform provider 110 via a cloud interface 132 to provision and configure the VMs 114 in the deployment environment 112A and/or containers 114a in the deployment environment 112B. The example cloud interface 132 of FIG. 1A provides a communication abstraction layer by which the application director 106 may communicate with a heterogeneous mixture of cloud provider(s) 110 and/or deployment environments 112A, 112B, 112C, etc. The deployment director 124 provides each VM 114 and/or Containers 114A with a series of tasks specific to the receiving VM 114 and/or Containers 114A (herein referred to as a "local deployment plan"). Tasks are executed by the VMs 114 and/or Containers 114A to install, configure, and/or start one or more application components. For example, a task may be a script that, when executed by a VM 114 and/or Containers 114A, causes the VM 114 and/or Containers 114A to retrieve and install particular software packages from a central package repository 134. The example deployment director 124 of FIG. 1A coordinates with the VMs 114 and/or Containers 114A to execute the tasks in an order that observes installation dependencies between VMs 114 and/or Containers 114A according to the deployment plan 128. After the application has been deployed, the application director 106 may be utilized to monitor and/or modify (e.g., scale) the deployment.

The cloud manager 138 of FIG. 1A interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1A additionally annotates basic blueprints and/or multi-machine blueprints to control how workflows associated with the basic blueprints and/or multi-machine blueprints are executed. A "workflow" as used herein is a series of actions and decisions to be executed in a virtual computing platform. The example system 100 of FIG. 1A includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 of FIG. 1A annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
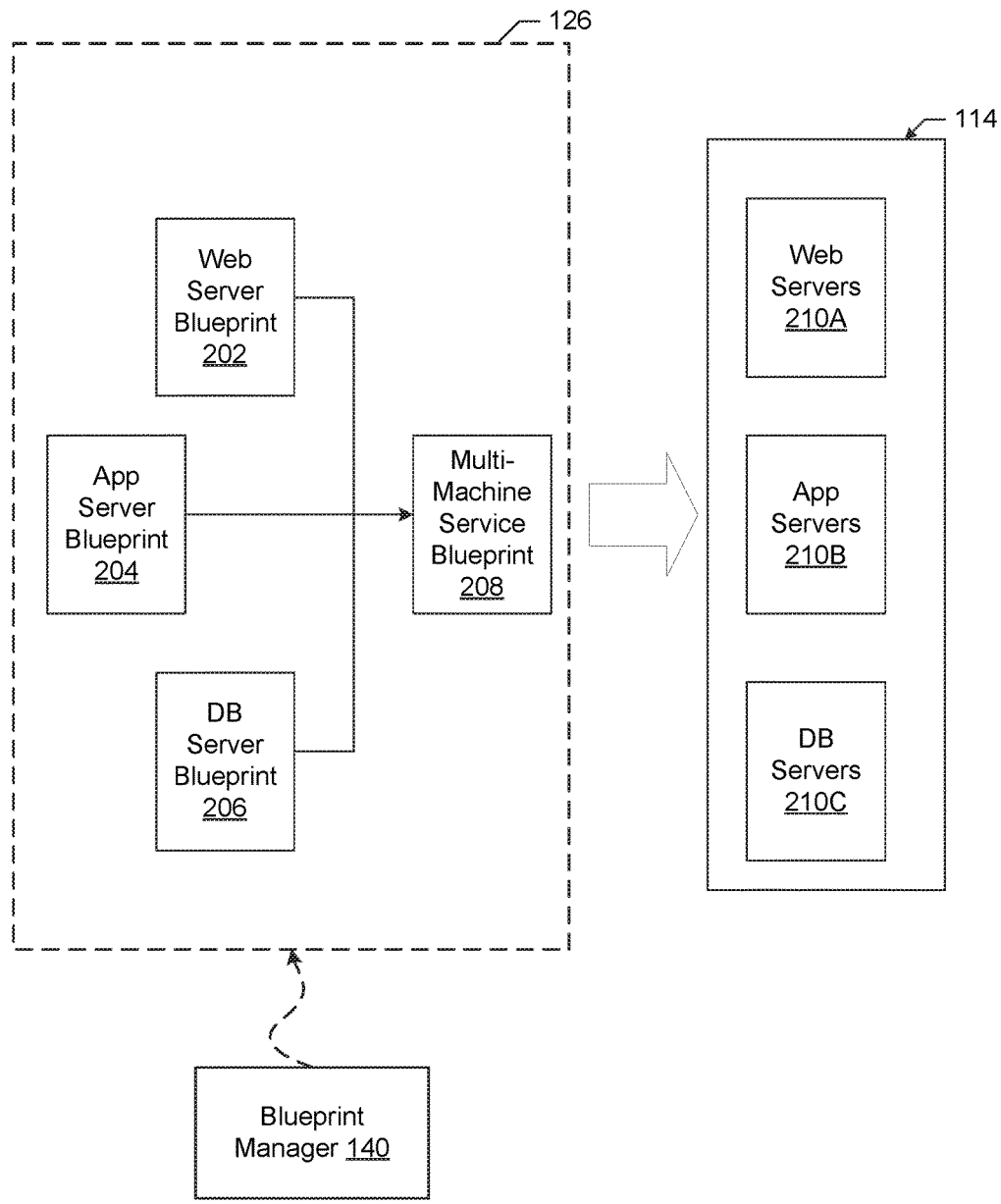
FIG. 2 illustrates an example generation of a multi-machine blueprint by the example blueprint manager of FIG. 1A.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint 210. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one of one or more varied or customized services. For example, if virtual machines deployed in the various States of the United States require different settings, a multi-machine blueprint could be generated for each such state. The multi-machine blueprints could reference the same build profile and/or disk image, but may include different settings specific to each state. For example, the deployment workflow may include an operation to set a locality setting of an operating system to identify a particular State in which a resource is physically located. Thus, a single disk image may be utilized for multiple multi-machine blueprints reducing the amount of storage space for storing disk images compared with storing a disk image for each customized setting.

Figure 3:
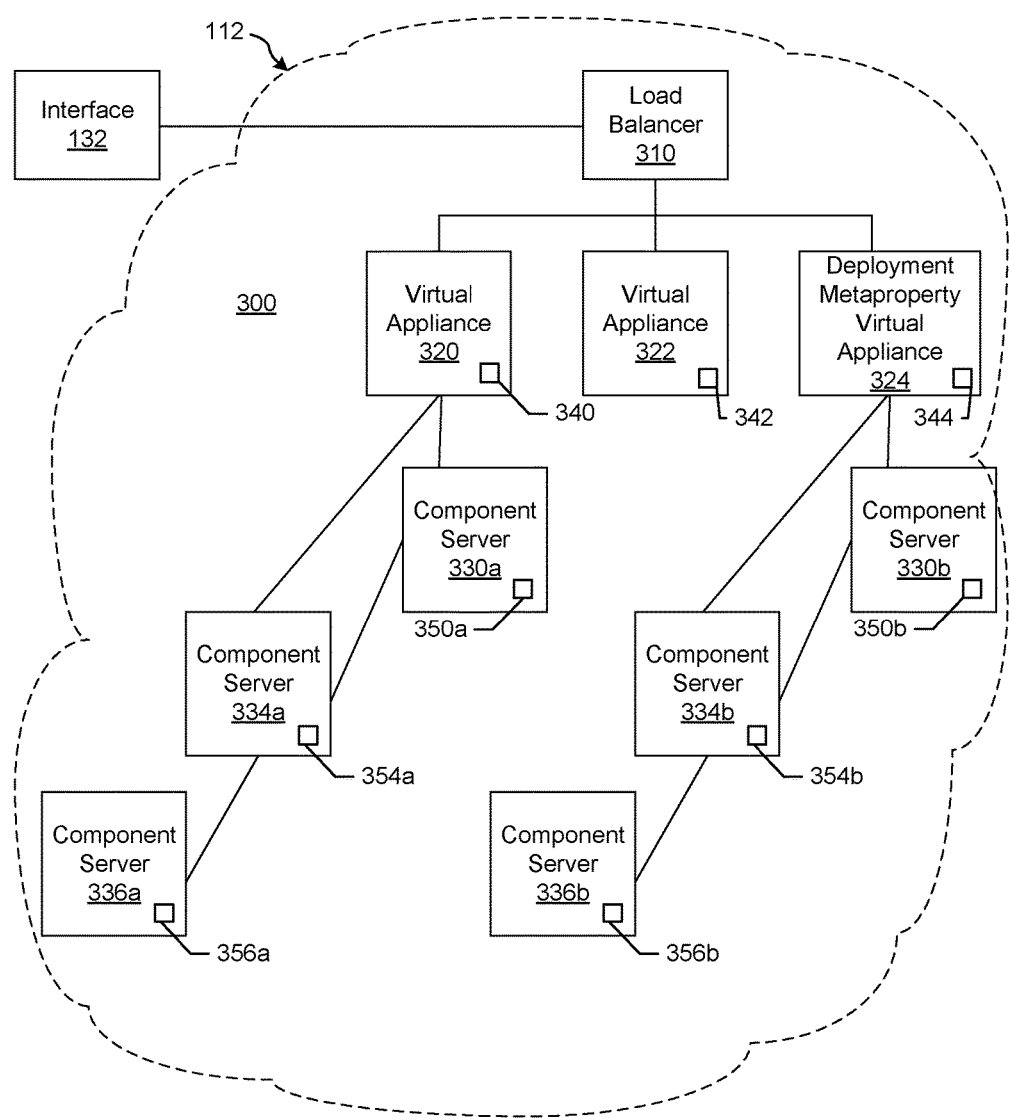
FIG. 3 illustrates an example installation of deployed virtual machines and associated servers acting as hosts for deployment of component servers for a customer.

FIG. 3 illustrates an example installation of deployed appliances or virtual appliances (vAs) (e.g. VMs 114 and or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 or container 114a. In this example, the vA 320 communicates with a plurality of component or host servers 330a, 334a, 336a which store components for execution by users (e.g., Web server 210A with Web components, App server 210B with application components, DB server 210C with database components, etc.). As shown in the example of FIG. 3, component servers 334a, 336a can stem from component server 330a rather than (or in addition to) directly from the virtual appliance 320, although the vA 320 can still communicate with such servers 334a, 336a. The LB 310 enables the multiple vAs 320-324 and multiple servers 330-336 to appear as one device to a user. Access to functionality can then be distributed among appliances 320-324 by the LB 310 and among servers 330a-336a by the respective appliance 320, for example.

In the example installation 300, each vA 320, 322, 324 includes a management endpoint 340, 342, 344. Each component server 330a, 334a, 336a includes a management agent 350a, 354a, 356a. The management agents 350a-356a can communicate with their respective endpoint 340 to facilitate transfer of data, execution of tasks, etc., for example. The LB 310 can use least response time, round-robin, and/or other method to balance traffic to vAs 320-324 and servers 330-336, for example.

In certain examples, a graphical user interface associated with a front end of the load balancer 310 guides a customer through one or more questions to determine system requirements for an installation 300 to be performed. Once the customer has completed the questionnaire and provided firewall access to install the agents 350a-356a, the agents 350a-356a communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (e.g. vA 320) is accessing different servers (e.g. Component Servers 330a-336a) depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

As will be discussed in greater detail subsequently herein, one or more of the virtual appliances (vAs) can be configured as a Deployment Metaproperty Virtual Appliance 324. Similar to vA 320 communicating with the plurality of component or host servers 330a, 334a, 336a, the Deployment Metaproperty Virtual Appliance 324 can similarly communicate with another plurality of component or host servers 330b, 334b, 336b, which can likewise store components for execution by users (e.g., Web server 210A with Web components, App server 210B with application components, DB server 210C with database components, etc.). Each component server 330b, 334b, 336b associated with the Deployment Metaproperty Virtual Appliance 324 can include a respective management agent 350b, 354b, 356b. These management agents 350b-356b can communicate with their respective endpoint 344 of Deployment Metaproperty Virtual Appliance 324 to facilitate transfer of data, execution of tasks, etc., for example.

Figure 4A:
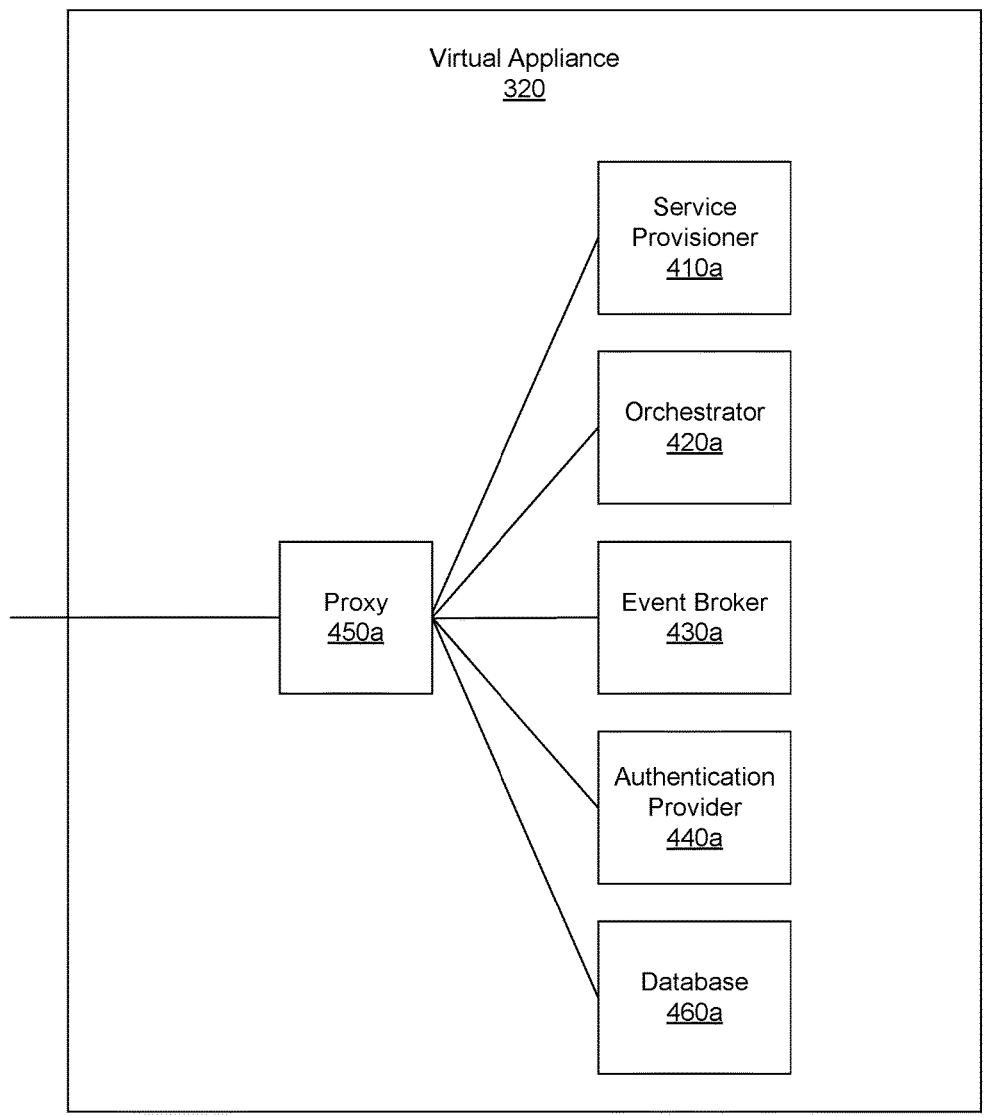
FIGS. 4A-4G illustrate example implementations of virtual appliances.
Figure 4B:
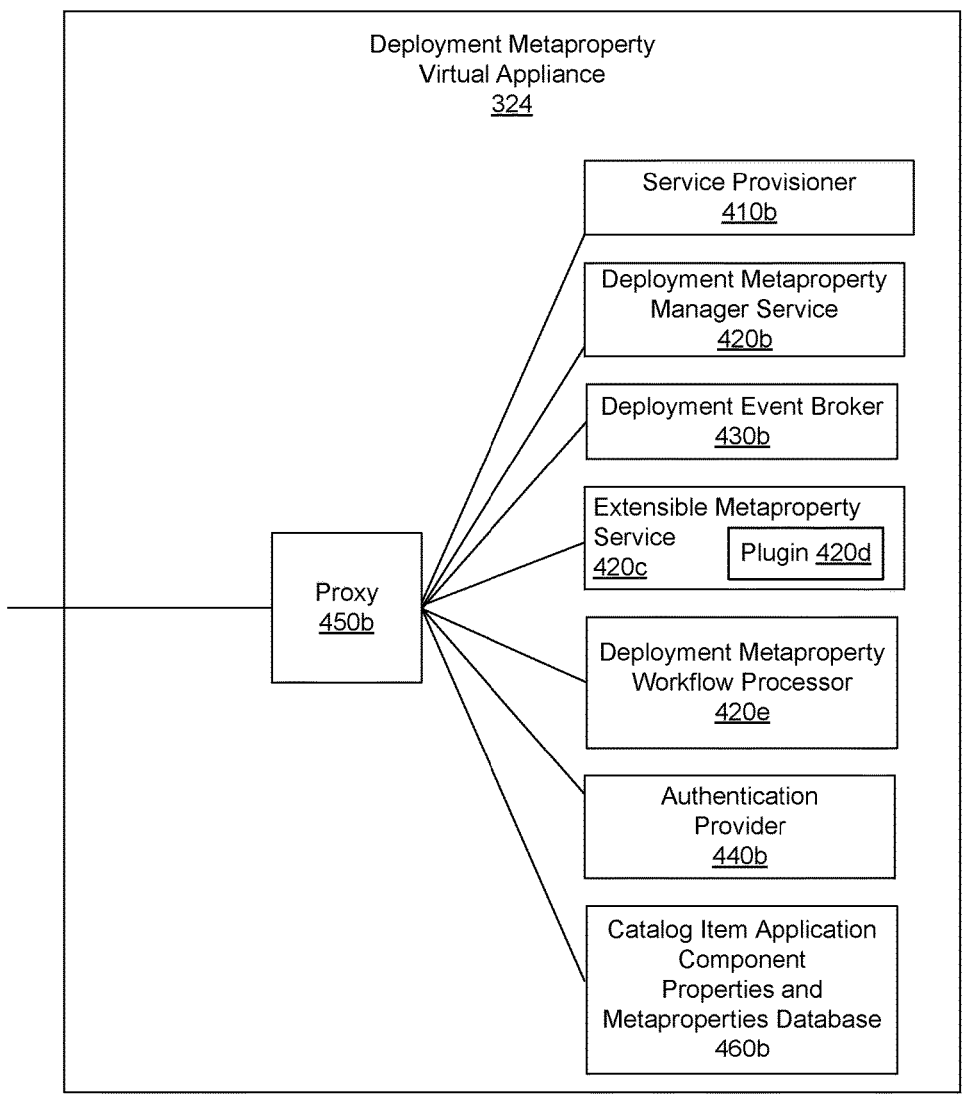
Figure 4C:
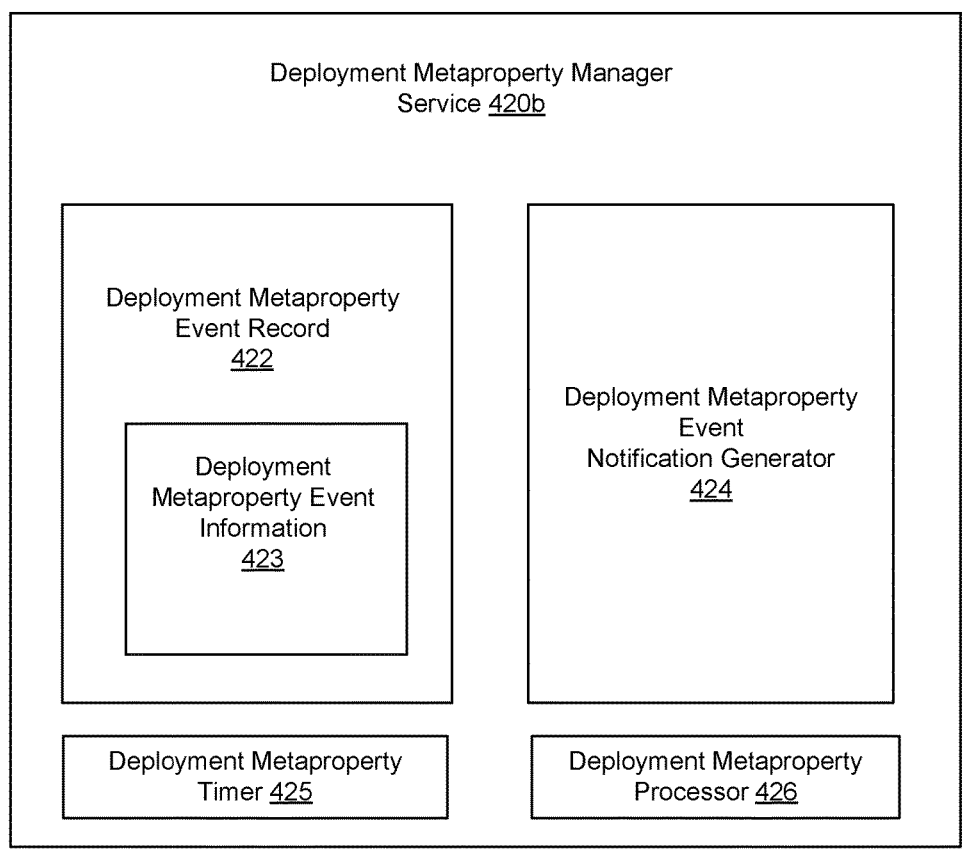
Figure 4D:
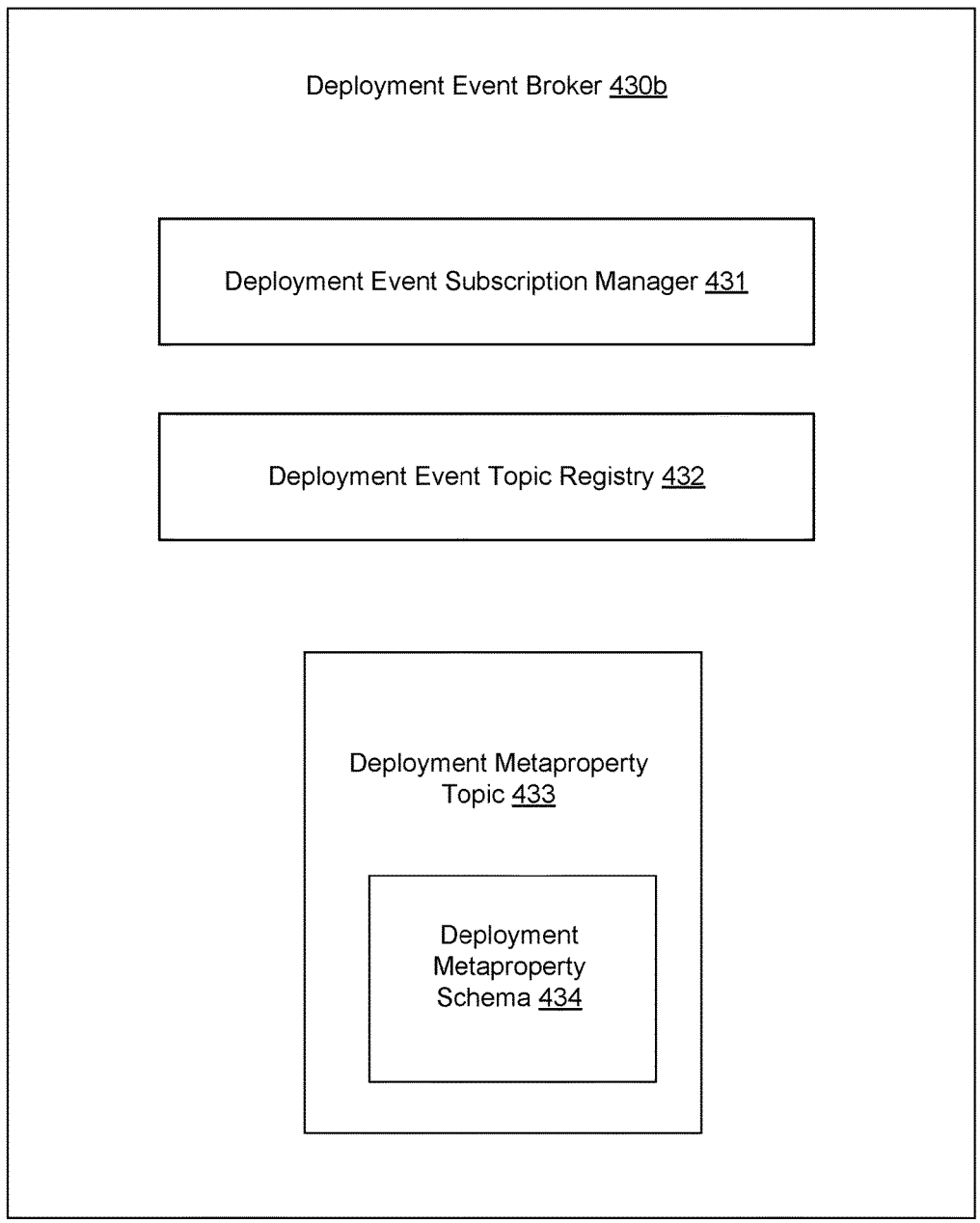
Figure 4E:
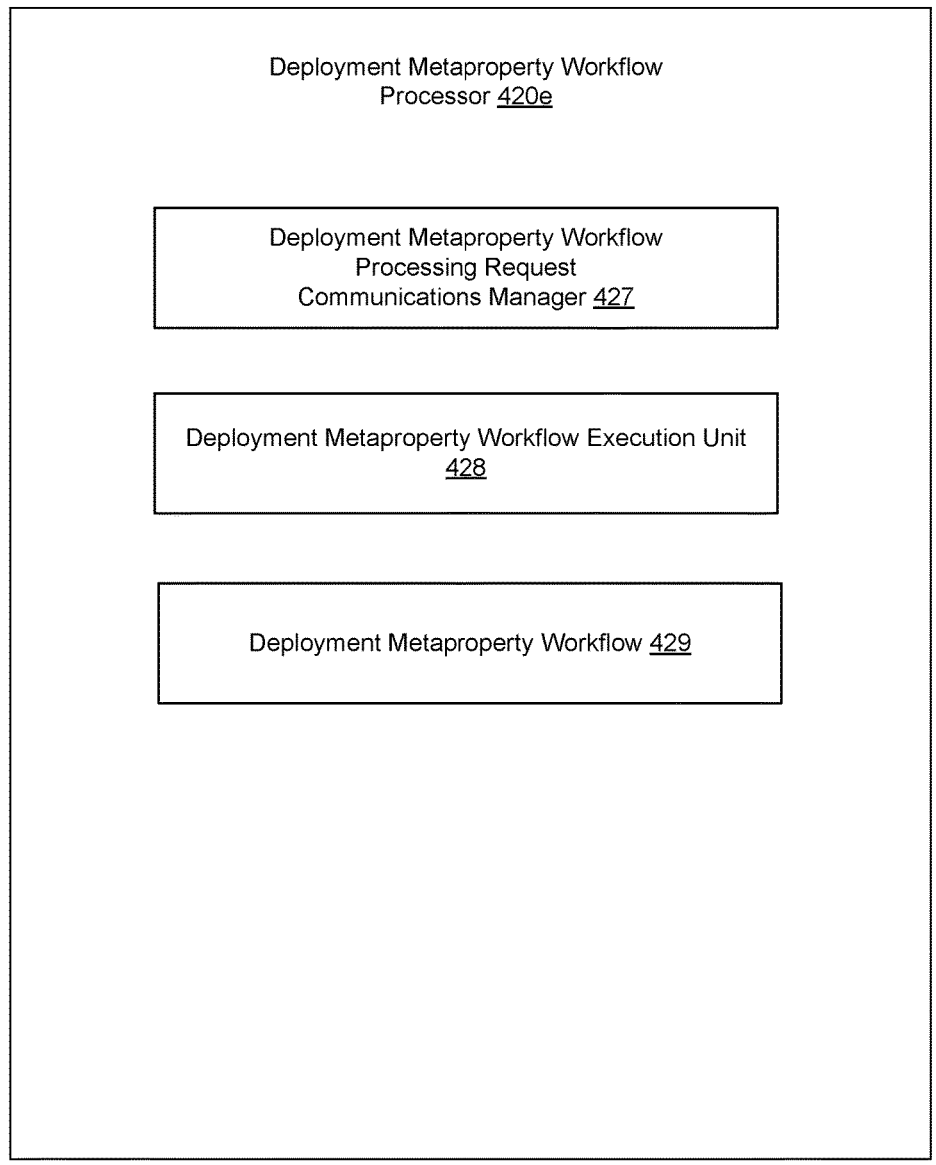
Figure 4F:
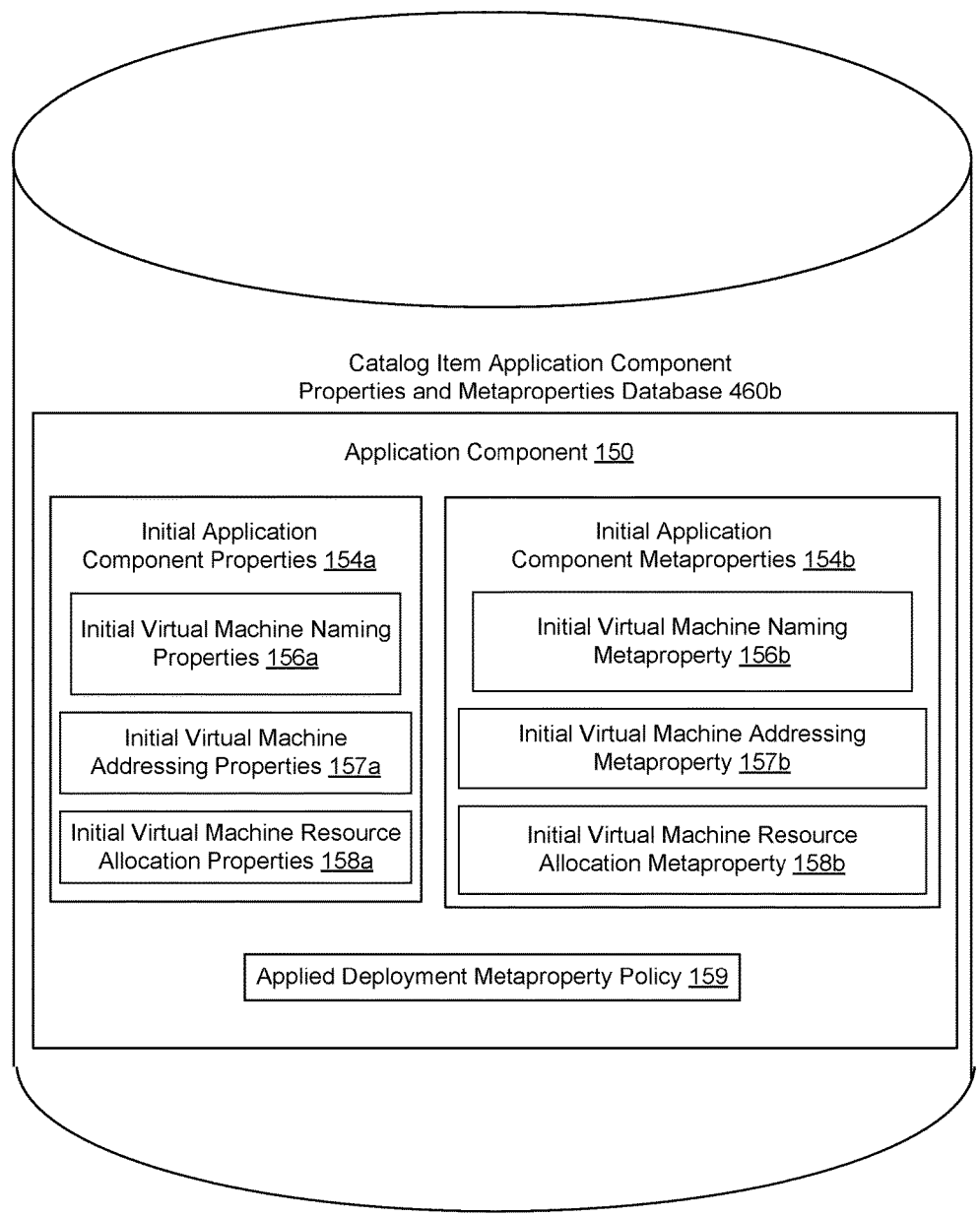
Figure 4G:
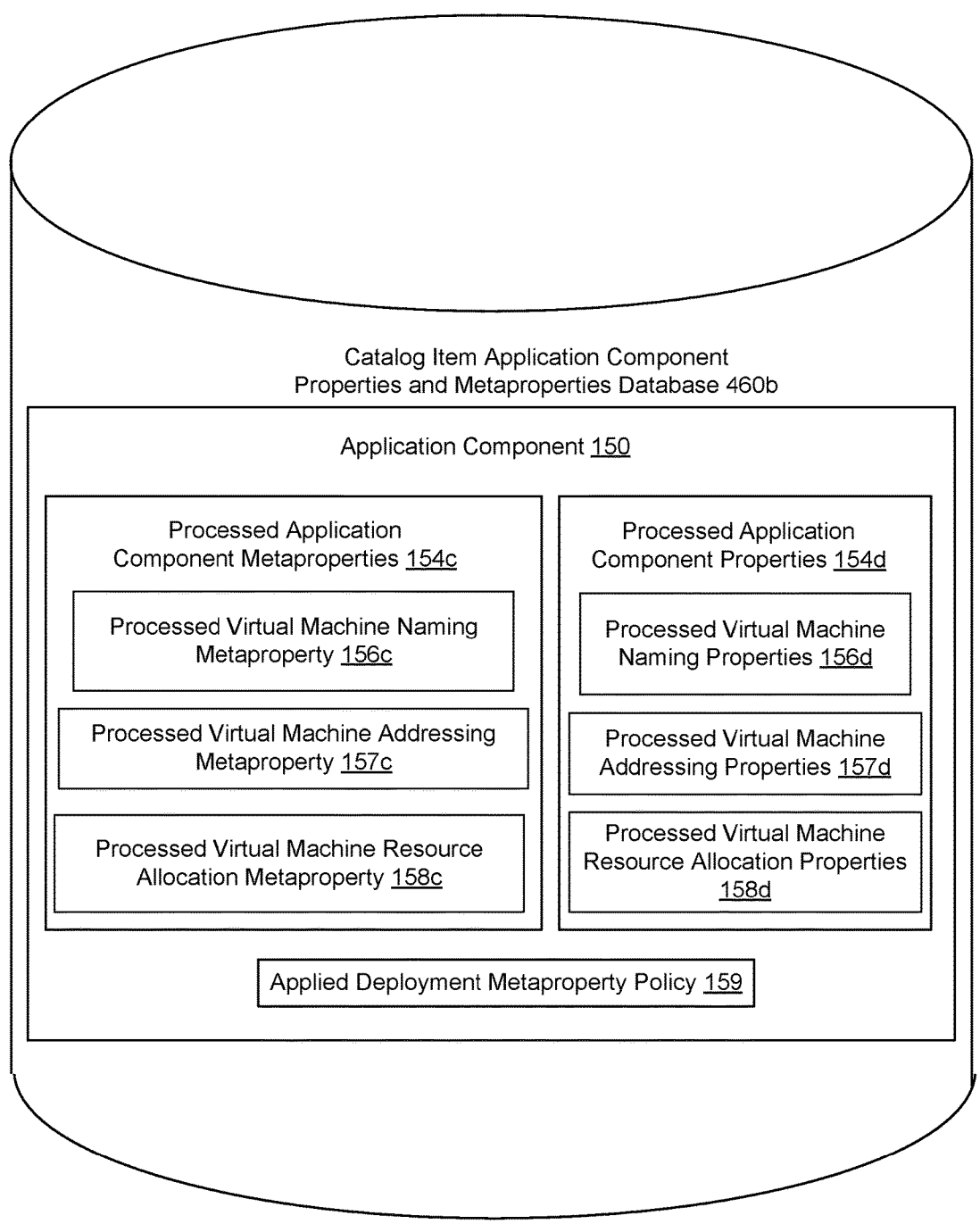

FIGS. 4A-4G illustrate example implementations of virtual appliances. The example of FIG. 4A illustrates a generalized example implementation of a vA 320 of FIG. 3. FIGS. 4B-4F illustrate a more particularized implementation of the Deployment Metaproperty Virtual Appliance 324.

Looking first at the example of FIG. 4A, the vA 320 of this example includes a Service Provisioner 410a, an orchestrator 420a, an event broker 430a, an authentication provider 440a, an internal reverse proxy 450a, and a database 460a. The components 410a, 420a, 430a, 440a, 450a, 460a of the vA 320 may be implemented by one or more of the VMs 114 or containers 114a. The example Service Provisioner 410a provides services to provision interfaces (e.g., Web interface, application interface, etc.) for the vA 320. The example orchestrator (e.g., vCO) 420a is an embedded or internal orchestrator for processing workflows, which can leverage a provisioning manager, such as the application director 106 and/or catalog database 130 and/or cloud manager 138, to provision VM services but is embedded in the vA 320. For example, the vCO 420a can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS extends this to also request, approve, provision, operate, and decommission any type of catalog items (i.e storage, applications, accounts, and anything else that the catalog provides as a service).

The example event broker 430a of FIG. 4A provides a mechanism to handle tasks which are transferred between services with the orchestrator 420a. The example authentication provider 440a (e.g., VMware Horizon™ services, etc.) authenticates access to services and data, for example.

The components of the vA 320 access each other through REST API calls behind the internal reverse proxy 450a (e.g., a high availability (HA) proxy HAProxy) which provides a high availability load balancer and proxy for Transmission Control Protocol (TCP) and Hypertext Transfer Protocol (HTTP) based application requests. In this example, the proxy 450a forwards communication traffic from within the vA 320 and/or between vAs 320, 322, 324 of FIG. 3 to the appropriate component(s) of the vA 320. In certain examples, services access the local host/proxy 450a on a particular port, and the call is masked by the proxy 450a and forwarded to the particular component of the vA 320. Since the call is masked by the proxy 450a, components can be adjusted within the vA 320 without impacting outside users.

FIGS. 4B-4G illustrate a more particularized example implementation of the Deployment Metaproperty Virtual Appliance 324. In the example of FIGS. 4B-4G the Deployment Metaproperty Virtual Appliance 324 includes a Service Provisioner 410b and a Deployment Metaproperty Manager Service 420b. The Deployment Metaproperty Manager Service 420b can include a Deployment Metaproperty Event Record 422, Deployment Metaproperty Event Information 423, a Deployment Metaproperty Event Notification Generator 424, a Deployment Metaproperty Timer 425 and a Deployment Metaproperty Processor 426, as shown in detail in the example of FIG. 4C. The Deployment Metaproperty Virtual Appliance 324 further includes Extensible Metaproperty Service 420c, which includes Plugin 420d.

The Deployment Metaproperty Virtual Appliance 324 further includes Deployment Metaproperty Workflow Processor 420e. The Deployment Metaproperty Workflow Processor 420e, as shown in detail in the example of FIG. 4E, can include a Deployment Metaproperty Workflow Communications Manager 427, a Deployment Metaproperty Workflow Execution Unit 428, and Deployment Metaproperty Workflow 429. The Deployment Metaproperty Virtual Appliance 324 further includes a Deployment Event Broker 430b. The Deployment Event Broker 430b can include a Deployment Event Subscription Manager 431, a Deployment Event Topic Registry 432, and a Deployment Metaproperty Topic 433 including a Deployment Metaproperty Schema 434. The Deployment Metaproperty Virtual Appliance 324 further includes an Authentication Provider 440b, a Proxy 450b and a Catalog Item Application Component Properties and Metaproperties Database 460b. As shown in greater detail in the example of FIGS. 4F and 4G the Catalog Item Metaproperty Database 460b can include Application Component 150. Application Component 150 can include Initial Application Component Properties 154a, Initial Application Component Metaproperties 154b, Processed Application Component Metaproperties 154c, Processed Application Component Properties 154d and Applied Deployment Metaproperty Policy 159. Initial Application Component Properties 154a can include Initial Virtual Machine Naming Properties 156a, Initial Virtual Machine Addressing Properties 157a and Initial Virtual Machine Resource Allocation Properties 158a. Initial Application Component Metaproperties 154b can include an initial Virtual Machine Naming Metaproperty 156b, Initial Virtual Machine Addressing Metaproperty 157b and Initial Virtual Machine Resource Allocation Metaproperty 158b. Processed Application Component Metaproperties 154c can include Processed Virtual Machine Naming Metaproperty 156c, Processed Virtual Machine Addressing Metaproperty 157c and Processed Virtual Machine Resource Allocation Metaproperty 158c. Processed Application Component Properties 154d can include Processed Virtual Machine Naming Properties 156d, Processed Virtual Machine Addressing Properties 157d and Processed Virtual Machine Resource Allocation Properties 158d.

The components 150, 154a, 154b, 154c, 154d, 156a, 156b, 156c, 156d, 157a, 157b, 157c, 157d, 158a, 158b, 158c, 158d, 159, 410b, 420b, 420c, 420d, 420e, 422, 423, 424, 425, 426, 427, 428, 429, 430b, 431, 432, 433, 434, 440b, 450b, and 460b of the Deployment Metaproperty Virtual Appliance 324 may be implemented by one or more VM's 114 or containers 114a.

Accordingly, similar to what was discussed previously in connection with FIG. 4A, in the example of FIGS. 4B-4G, the Deployment Metaproperty Virtual Appliance 324 likewise includes a Service Provisioner 410b and an internal reverse proxy 450b. The Service Provisioner 410b provides services to provision interfaces (e.g., Web interface, application interface, etc.) for the Deployment Metaproperty Virtual Appliance 324. The proxy 450b forwards communication traffic from within the Deployment Metaproperty Virtual Appliance 324 and/or between vAs 320, 322, 324 of FIG. 3 to the appropriate component(s) of the Deployment Metaproperty Virtual Appliance 324. The components of the Deployment Metaproperty Virtual Appliance 324 access each other through REST API calls behind the internal reverse proxy 450b (e.g., a high availability (HA) proxy HAProxy) which provides a high availability load balancer and proxy for Transmission Control Protocol (TCP) and Hypertext Transfer Protocol (HTTP) based application requests.

Further, the previous discussions of the example orchestrator (e.g., vCO) 420a are likewise applicable to the Deployment Metaproperty Manager Service 420b and the Deployment Metaproperty Workflow Processor 420e. The Deployment Metaproperty Manager Service 420b and the Deployment Metaproperty Workflow Processor 420e can likewise be embedded or internal, but also can be external, and can function as orchestrators for processing workflows. The Deployment Metaproperty Manager Service 420b and the Deployment Metaproperty Workflow Processor 420e can likewise leverage the provisioning manager, such as the application director 106 and/or catalog database 130 and/or cloud manager 138, to provision VM services. The application director 106 and/or catalog database 130 and/or cloud manager 138 can be embedded in the Deployment Metaproperty Virtual Appliance 324. In an example, the Deployment Metaproperty Manager Service 420b, and the example Deployment Metaproperty Workflow Processor 420e can be used to invoke a blueprint to provision a manager for services.

As another example, the Catalog Item Application Component Properties and Metaproperties Database 460b shown in FIG. 4B (and shown in greater detail in FIGS. 4F and 4G) can leverage the catalog database 130 shown in FIG. 1A, so that Catalog Item Application Component Properties and Metaproperties Database 460b can include Application Component 150 including Initial Application Component Properties 154a and Applied Deployment Metaproperty Policy 159. Examples of Application Component Properties 154a from the example of FIG. 1B and also in the example of FIG. 4F include an Initial Virtual Machine Naming Property, an Initial Virtual Machine Addressing Property, and an Initial Virtual Machine Resource Allocation Property. In other examples: the example Initial Virtual Machine Naming Property can be plural examples of Initial Virtual Machine Naming Properties 156a, an example Initial Virtual Machine Addressing Property can be plural examples of Initial Virtual Machine Addressing Properties 157a, and an example Initial Virtual Machine Resource Allocation Property can be plural examples of Initial Virtual Machine Resource Allocation Properties 158a. The forgoing are related to VM's. For example, the Initial Virtual Machine Resource Allocation Properties 158a can be broadly directed to examples such as an initial Central Processing Unit (CPU) allocation property for VM's, and an initial memory allocation property for VM's, etc.

As mentioned previously herein, there is a customization need to generate one or more Processed Application Component Properties based on one or more of the Initial Application Component Properties. However, it may be overly burdensome on computation resources to directly customize and/or modify (e.g. process) Initial Application Component Properties into Processed Application Component Properties. In accordance with the examples of this disclosure, indirect processing using metaproperties can achieve the desired result of one or more Processed Application Component Properties, while limiting burden on computational resources. The example of FIG. 4G shows Processed Application Component Properties 154d, including for example Processed Virtual Machine Properties 156d, Processed Virtual Machine Addressing Properties 156d, Processed Virtual Machine Addressing Properties 157d and Processed Virtual Machine Resource Allocation Properties 158d.

As mentioned previously, numerosity of the Initial Application Component Properties 154a can be very large. For example, the number of the Initial Application Component Properties 154a can be substantially greater than one hundred Initial Application Component Properties 154a. Furthermore, direct customization or modification of all of the initial application component properties 154a using event notifications and schema of an event broker could create an amount of data that is so large as to be impractical as it excessively loads down computing system resources (e.g., database reads, network traffic, processing etc.). First, this loading is because of the numerosity of the Initial Application Component Properties 154a. Moreover, this loading is because large data structures having variable-length elements like an array of properties (e.g. key-value pairs) would be used by the schema of the event broker in event notifications. Such event notifications would be needed for deployment customization and/or modification (e.g. processing) of the Initial Application Component Properties 154a into Processed Application Component Properties. Accordingly, there is a compelling need to find some way to limit data transferred over the network in deployment provisioning.

Figure 5:
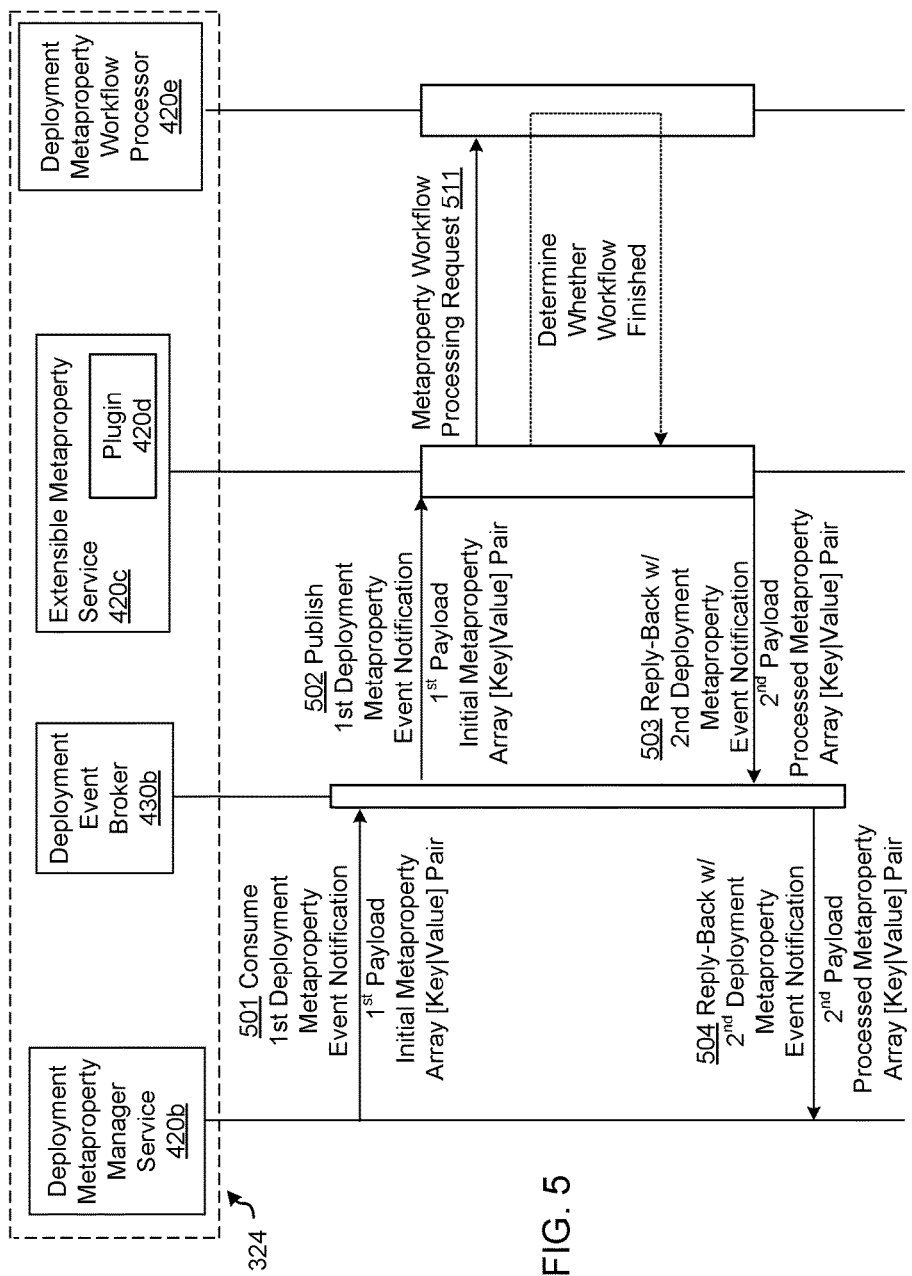
FIG. 5 illustrates deployment metaproperty event notifications occurring in the context of the example Deployment Metaproperty Virtual Appliance 324 of FIGS. 4B-4G

In response to this compelling need, examples of this disclosure can interpret part of the numerous Initial Application Component Properties 154a as an Initial Application Component Metaproperty (see for example Initial Application Component Metaproperties 154b in the example of FIG. 4F.) By operating on a more limited data volume of the Initial Application Component Metaproperty for deployment customization and/or modification, rather than operating directly on the numerous Initial Application Component Properties 154a, examples of this disclosure can limit data volume, and so reduce and/or limit loading down of computing system resources (e.g. database reads, network traffic, processing etc.). In the example of FIG. 4D, Deployment Metaproperty Schema 434 of Deployment Metaproperty Topic 433 of Deployment Event Broker 430b can use a data structure having a variable-length element like a property array or metaproperty array (e.g. key-value pair) in First and Second Metaproperty Payloads as shown in the example of FIG. 5 for the respective Initial Application Component Metaproperty and Processed Application Component Metaproperty. Examples of the Initial Application Component Metaproperties 154b shown in FIG. 4F include Initial Virtual Machine Naming Metaproperty 156b, Initial Virtual Machine Addressing Metaproperty 157b and Initial Virtual Machine Resource Allocation Metaproperty 158b. Examples of the Processed Application Component Metaproperties 154c shown in FIG. 4F include Processed Virtual Machine Naming Metaproperty 156c, Processed Virtual Machine Addressing Metaproperty 157c and Processed Virtual Machine Resource Allocation Metaproperty 158c.

After the Deployment Event Broker 430b replies back to the Metaproperty Manager Service 420b with the Processed Application Component Metaproperty, the Metaproperty Manager Service 420b can use the Processed Application Component Metaproperty to generate a Processed Application Component Property (based upon the Processed Application Component Metaproperty). The result of the Processed Application Component Property can then provide for the deployment customization of the Application Component 150, while also having reduced and/or limited loading down of computing system resources (e.g. database reads, network traffic, processing etc.) in the operations of the example of this disclosure, which provide the result of the Processed Application Component Property. In the example of FIG. 4G, the resulting Processed Application Component Property can be associated and/or included with the Application Component 150 in the Catalog Item Application Component Properties and Metaproperties Database 460b.

The Application Component 150 can provide a logical template of Application 102, 102a for deployment in an Application Deployment Environment 112. The Catalog Item Application Component Properties and Metaproperties Database 460b can include the Application Component 150 to provide the logical template of the Application 102, 102a.

The example Deployment Metaproperty Manager Service, also referenced more generally as Deployment Metaproperty Manager 420b, can be implemented as a service. As mentioned previously, various services can include catalog services, identity services, component registry services, event broker services, IaaS, XaaS, etc. Using the IaaS, the Deployment Metaproperty Manager Service 420b and/or the Deployment Metaproperty Workflow Processor 420e can provision one or more VMs for the customer via the Deployment Metaproperty Virtual Appliance 324. This can be extended using the XaaS, so that the Deployment Metaproperty Manager Service 420b and/or the Deployment Metaproperty Workflow Processor 420e can provide for various deployment activities (e.g. requesting, approving, provisioning, operating, and/or decommissioning) with respect to any type of catalog database 130 items (i.e storage, applications, accounts, and anything else that the catalog database 130 provides as a service).

As mentioned previously, Catalog services provide the user interface via which the user can request provisioning of different preset environments (e.g., a VM including an operating system and software and some customization, etc.), for example. When a user requests a catalog item that can be customized, this is an example of an occurrence of a deployment Metaproperty event (a deployment Metaproperty event occurrence.) For example, the catalog item can be an Application Component 150. When a user requests the Application Component 150 this is an example of a deployment metaproperty event occurrence.

The Deployment Metaproperty Manager Service 420b shown in FIG. 4B (and shown in greater detail in FIG. 4C) can include a Deployment Metaproperty Event Record 422 that records Deployment Metaproperty Event Information 423 about the Deployment Metaproperty Event Occurrence. For example, the Deployment Metaproperty Manager Service 420b can include a Deployment Metaproperty Event Record 422 that records Deployment Metaproperty Event information 423 about the user requesting the Application Component 150. The Deployment Metaproperty Event Record 422 that records Deployment Metaproperty Event Information 423 about the deployment Metaproperty event occurrence can include a deployment Metaproperty event log 422.

The Deployment Metaproperty Manager Service 420b can include a Deployment Metaproperty Processor 426 to process the Deployment Metaproperty Event Information, and can further include a Deployment Metaproperty Event Notification Generator 424. The Deployment Metaproperty Event Notification Generator 424 of the Deployment Metaproperty Manager 420b can generate a First Deployment Metaproperty Event Notification in response to the Deployment Metaproperty Event Record 422 that records Deployment Metaproperty Event Information 423 about a deployment metaproperty event occurrence. The first Deployment Metaproperty Event Notification can include Deployment Metaproperty Event Information 423, and can include a First Metaproperty Payload including the Initial Application Component Metaproperty.

The Initial Application Component Metaproperty of the First Metaproperty Payload can include at least one of an initial virtual machine naming metaproperty, an initial virtual machine addressing metaproperty, and an initial virtual machine resource allocation metaproperty. The initial virtual machine resource allocation metaproperty can be broadly directed to examples such as an initial Central Processing Unit (CPU) allocation metaproperty for VM's, and an initial memory allocation metaproperty for VM's, etc.

An example deployment metaproperty policy can be applied to the Application Component 150 in the database 460*b* (e.g. Applied Deployment Metaproperty Policy 159.) The example deployment metaproperty manager 420*b* can generate the initial application component metaproperty, for example via the Deployment Metaproperty Processor 426 and the Applied Deployment Metaproperty Policy 159. Generating the initial application component metaproperty can include whitelisting a respective one of the initial application component properties 154*a*. For example, via the Deployment Metaproperty Processor 426, the Deployment Metaproperty Manager 420 can select from among the plurality of Initial Application Component Properties 154*a* to whitelist into the Initial Application Component Metaproperty, in accordance with the Applied Deployment Metaproperty Policy 159. The initial application component metaproperty can include at least one of: an initial virtual machine naming metaproperty, an initial virtual machine addressing metaproperty, and an initial virtual machine resource allocation metaproperty.

In another example, the Initial Application Component Metaproperty can be a plurality of Initial Application Component Metaproperties 154*b*. The deployment metaproperty policy is applied to the Application Component 150 in the database 460*b* (e.g. Applied Deployment Metaproperty Policy 159). The Deployment Metaproperty Manager 420 can select from among the plurality of Initial Application Component Properties 154*a* to whitelist into the Initial Application Component Metaproperties 154*b* in accordance with the deployment metaproperty policy 159. The Initial Application Component Metaproperties 154*b* can include at least one of: an initial virtual machine naming metaproperty, an initial virtual machine addressing metaproperty, and an initial virtual machine resource allocation metaproperty. In yet another example, the selected initial application component property can be a first selected grouping of initial application component properties. The generating of the initial application component metaproperty can include whitelisting the first selected grouping of initial application component properties to generate the initial application component metaproperty. For example, the Deployment Metaproperty Manager 420 can select the first selected grouping of initial application component properties to whitelist into the initial application component metaproperty. For example, the Deployment Metaproperty Manager 420 can use wildcards and/or have multiple sub-values in a value field, which can be separated by a pre-defined symbol, to select the first selected grouping of initial application component properties to whitelist into the initial application component metaproperty.

As already mentioned, the first Deployment Metaproperty Event Notification can include Deployment Metaproperty Event Information 423, and can include a First Metaproperty Payload including the Initial Application Component Metaproperty. The First Metaproperty Payload of First Deployment Event Notification can include a serialized form of at least a portion of the Deployment Metaproperty Event Record 422 that records the Deployment Metaproperty Event Information 423 about the deployment metaproperty event occurrence. The Deployment Metaproperty Manager 420*b* can generate the First Deployment Metaproperty Event Notification in response to the Deployment Metaproperty Event Record 422 that records Deployment Metaproperty Event Information 423 about the deployment metaproperty event occurrence.

The Deployment Metaproperty Event Notification Generator 424 of the Deployment Metaproperty Manager Service 420*b* can send the First Deployment Metaproperty Event Notification to the Deployment Event Broker 430*b*. For example, the Deployment Metaproperty Event Notification Generator 424 of the Deployment Metaproperty Manager Service 420*b* can submit the First Deployment Metaproperty Event Notification to the Deployment Metaproperty Topic 433 of the Deployment Event Broker 430*b* for publication to the Extensible Metaproperty Service 420*c*. The Deployment Event Broker 430*b* can consume the First Deployment Metaproperty Event Notification 501 submitted by the Deployment Metaproperty Manager Service 420*b*. Authentication provider 440*b* can authenticate access to the Deployment Event Broker 430*b*.

The Deployment Metaproperty Event Broker 430*b* of this example includes a scalable distributed service. The Deployment Metaproperty Manager Service 420*b* can start the Deployment Metaproperty Timer 425 running, after the Deployment Metaproperty Manager Service 420*b* sends the First Deployment Metaproperty Event Notification to the Deployment Event Broker 430*b*. The Deployment Metaproperty Manager Service 420*b* can wait, for a predetermined period of time as indicated using the Deployment Metaproperty Timer 425, for a responsive event notification (e.g. a reply-back) from the Deployment Event Broker 430*b*. For example, if the predetermined time period is 24 hours, then the Deployment Metaproperty Manager Service 420*b* can wait for 24 hours a reply-back from the Deployment Event Broker 430*b*. If the Deployment Metaproperty Manager Service 420*b* receives no reply-back from the Deployment Event Broker 430*b* within the predetermined time period as indicated by the Deployment Metaproperty Timer 425, then the Deployment Metaproperty Manager Service 420*b* can notify the user.

The Deployment Event Broker 430*b* shown in FIG. 4B, and shown in greater detail in FIG. 4D can include a Deployment Event Subscription Manager 431, a Deployment Metaproperty Topic Registry 432 and a Deployment Metaproperty Topic 433. The Deployment Metaproperty Topic 433 can include a Deployment Metaproperty Schema 434. The Deployment Event Broker 430*b* includes a Deployment Metaproperty Topic 433 to publish the First Deployment Metaproperty Event Notification 502 to the Extensible Metaproperty Service 420*c*, in response to the Deployment Event Broker 430*b* consuming the First Deployment Metaproperty Event Notification 501.

The Extensible Metaproperty Service 420*c* can include at least one Plugin 420*d* so as to facilitate extensibility of the Extensible Metaproperty Service 420*c*. The Deployment Metaproperty Workflow Processor 420*e* can be employed to process a deployment metaproperty workflow 429. The Plugin 420*d* of the Extensible Metaproperty Service 420*c* can facilitate communication between the Extensible Metaproperty Service 420*c* and the Deployment Metaproperty Workflow Processor 420*e*. The Extensible Metaproperty Service 420*c* can generate a Deployment Metaproperty Workflow Processing Request 511 in response to the First Deployment Metaproperty Notification 502. The Deployment Metaproperty Workflow Processing Request 511 can include the Initial Application Component Metaproperty.

Examples of the Deployment Metaproperty Workflow Processor 420e shown in FIG. 4B are shown in greater detail in FIG. 4E. As shown in FIG. 4E, the Deployment Metaproperty Workflow Processor 420e can include a Deployment Metaproperty Workflow Communications Manager 427 to manage communications with the Deployment Metaproperty Workflow Processors 420e. Additionally, the Deployment Metaproperty Workflow Processor 420e can include Deployment Metaproperty Workflow Execution Unit 428 to process the Deployment Metaproperty Workflow 429.

The Deployment Metaproperty Workflow Processor 420e can process the Deployment Metaproperty Workflow 429 to process the Initial Application Component Metaproperty of the First Metaproperty Payload into the Processed Application Component Metaproperty to be included in the Second Metaproperty Payload. As mentioned previously, the Initial Application Component Metaproperty of the First Metaproperty Payload can include at least one of an Initial Virtual Machine Naming Metaproperty, an Initial Virtual Machine Addressing Metaproperty, and an Initial Virtual Machine Resource Allocation Metaproperty. The Processed Application Component Metaproperty of the Second Metaproperty Payload can include at least one of a Processed Virtual Machine Naming Metaproperty, a Processed Virtual Machine Addressing Metaproperty, and a Processed Virtual Machine Resource Allocation Metaproperty.

The Deployment Metaproperty Workflow Processor 420e can process the Deployment Metaproperty Workflow 429 in response to the Deployment Metaproperty Workflow Processing Request 511. The Deployment Metaproperty Workflow 429 can process the Initial Application Component Metaproperty into the Processed Application Component Metaproperty. In another example, the Initial Application Component Metaproperty can be a plurality of Initial Application Component Metaproperties 154b, and the deployment metaproperty workflow processor can process the Initial Application Component Metaproperties 154b into a plurality of Processed Application Component Metaproperties 154c.

For example, an Initial Application Component Metaproperty of the First Metaproperty Payload can be processed by the Deployment Metaproperty Workflow Processor 420e into a Processed Application Component Metaproperty to be included in a Second Metaproperty Payload. More particularly, for example, the initial virtual machine naming metaproperty (for example "foo-machine-name") of the First Metaproperty Payload can be processed into the processed virtual machine naming metaproperty (for example "my-foo-machine-name") to be included in the Second Metaproperty Payload. For example, the initial virtual machine addressing metaproperty (for example an address reservation "198.111.111") can be processed into processed virtual machine addressing metaproperty (for example an address reservation "198.999.999").

Similarly, for example, at least one Initial Virtual Machine Resource Allocation Metaproperty of the First Metaproperty Payload can be processed by the Deployment Metaproperty Workflow Processor 420e into at least one Processed Virtual Machine Resource Allocation Metaproperty to be included in the Second Metaproperty Payload. For example, the Initial Virtual Machine Memory Allocation Metaproperty (for example "4 Gigabytes of Memory") of the First Metaproperty Payload can be processed into the Processed Virtual Machine Memory Allocation Metaproperty (for example "2 Gigabytes of Memory") to be included in the Second Metaproperty Payload. For example, the Initial Virtual Machine Central Processing Unit (CPU) Allocation Metaproperty (for example "4 CPUs") of the First Metaproperty Payload can be processed into the Processed Virtual Machine Central Processing Unit (CPU) Allocation Metaproperty (for example "2 CPU's") to be included in the Second Metaproperty Payload.

The Extensible Metaproperty Service 420c can be in communication with the Deployment Metaproperty Workflow Processor 420e to determine whether the Deployment Metaproperty Workflow Processor 420e is finished processing the Deployment Metaproperty Workflow 429 (e.g. whether the Deployment Metaproperty Workflow Processor 420e is finished processing the Initial Application Component Metaproperty into the Processed Application Component Metaproperty.) The Deployment Metaproperty Workflow Processor 420e can respond to the Extensible Metaproperty Service 420c with the Processed Application Component Metaproperty to be included in the Second Metaproperty Payload, after the Deployment Metaproperty Workflow Processor 420e finishes processing of the Deployment Metaproperty Workflow 429 (e.g. after the Deployment Metaproperty Workflow Processor 420e is finished processing the Initial Application Component Metaproperty into the Processed Application Component Metaproperty.) The Extensible Metaproperty Service 420c can generate a Second Deployment Metaproperty Event Notification 503 in response to an occurrence of the Deployment Metaproperty Workflow Processor 420e finishing processing of the Deployment Metaproperty Workflow 429 (e.g. generate the Second Deployment Metaproperty Event Notification 503 in response to an occurrence of the Workflow Processor 420e finishing processing the Initial Application Component Metaproperty into the Processed Application Component Metaproperty.) The Second Deployment Metaproperty Event Notification 503 includes the second metaproperty payload. The second metaproperty payload includes The Processed Application Component Metaproperty.

The Deployment Metaproperty Topic 433 of the Deployment Event Broker 430b can be repliable. The Extensible Metaproperty Service 420c can reply back to the Deployment Metaproperty Topic 433 of the Deployment Event Broker 430b with the Second Deployment Metaproperty Event Notification 503 including the Second Metaproperty Payload. In turn, the Deployment Metaproperty Topic 433 of the Deployment Event Broker 430b can reply back to the Deployment Metaproperty Manager 420b with the Second Deployment Metaproperty Event Notification 504 including the second metaproperty payload. The Deployment Metaproperty Manager 420b can generate a Processed Application Component Property from the Processed Application Component Metaproperty.

In another example, the Processed Application Component Metaproperty can be a plurality of Processed Application Component Metaproperties 154c, and the deployment metaproperty manager can generate a plurality of Processed Application Component Properties 154d from the plurality of Processed Application Component Metaproperties 154c.

The deployment metaproperty manager 420b can associate the Application Component 150 with the Processed Application Component Property. In the example of FIG. 4G, the resulting Processed Application Component Property can be associated and/or included with the Application Component 150 in the Catalog Item Application Component Properties and Metaproperties Database 460b. The Application Component 150 can provide a logical template of Application 102, 102a for deployment in an Application Deployment Environment 112. The Catalog Item Application Component Properties and Metaproperties Database 460b can include the Application Component 150 to provide the logical template of the Application 102, 102a.

In another example, the Processed Application Component Property can be a plurality of Processed Application Component Properties 154d. The Deployment Metaproperty Manager can associate the Application Component 150 with the plurality of Processed Application Component Properties 154d. For example, the Processed Application Component Properties 154d can be associated and/or included with the Application Component 150 in the Catalog Item Application Component Properties and Metaproperties Database 460b.

FIG. 5 illustrates deployment metaproperty event notifications occurring in the context of the example Deployment Metaproperty Virtual Appliance 324 of FIGS. 4B-4G. In the example of FIG. 5, included are Deployment Metaproperty Manager Service 420b, Deployment Event Broker 430b, Extensible Metaproperty Service 420c including Plugin 420d and kept deployment Metaproperty Workflow Processor 420e. The Deployment Metaproperty Manager Service 420b can generate a First Deployment Metaproperty Event Notification that includes a First Metaproperty Payload. The First Metaproperty Payload includes the Initial Application Component Metaproperty. The Deployment Metaproperty Manager Service 420b can submit the First Deployment Metaproperty Event Notification 501, including the First Metaproperty Payload, to the Deployment Event Broker 430b for publication. The First Metaproperty Payload can include the Initial Application Component Property. As mentioned previously, example Deployment Metaproperty Schema 434 of Deployment Metaproperty Topic 433 of Deployment Event Broker 430b can use a data structure having a variable-length element like a property array, or in this case an initial metaproperty array (e.g. key-value pair) for storing the Initial Application Component Metaproperty of the First Payload, as shown for example in FIG. 5. As a general matter, in the example topic-based system shown in the figures, event notifications are published by event notification producers/generators to the Deployment Metaproperty Topic 433 of the Deployment Event Broker 430b, and in turn the Deployment Metaproperty Topic 433 publishes the event notifications to subscribers registered with the Deployment Metaproperty Topic 433 to receive the event notifications. The Deployment Metaproperty Topic 433 functions as a named logical channel for subscribers registered with the Deployment Metaproperty Topic 433 to receive the event notifications. The Deployment Metaproperty Topic 433 of the Deployment Event Broker 430b can perform a store and forward function to route event notifications from event notification producers/generators to subscribers. So in the example shown in FIG. 5, the Deployment Metaproperty Topic 433 of the Deployment Event Broker 430b can route/publish the First Deployment Metaproperty Event Notification from the Deployment Metaproperty Manager Service 420b (as event notification generator/producer) to the Extensible Metaproperty Service 420c (as event notification subscriber).

As shown in the example of FIG. 5, the Deployment Event Broker 430b can consume the First Deployment Metaproperty Event Notification 501 (including the First Metaproperty Payload) submitted by the Deployment Metaproperty Manager Service 420b. The Deployment Event Broker 430b then routes/publishes the First Deployment Metaproperty Event Notification 502 to the Extensible Metaproperty Service 420c as subscriber to the Deployment Metaproperty Topic 433, in response to the Deployment Event Broker 430b consuming the First Deployment Metaproperty Event Notification 501. It should be noted that the Deployment Metaproperty Topic 433 of the Deployment Event Broker 430b can be repliable. For example, since the example Deployment Metaproperty Topic 433 is repliable, the example Deployment Metaproperty Topic 433 can accept the Second Deployment Metaproperty Event Notification as a reply-back notification from the Extensible Metaproperty Service 420c subscriber, in reply-back to the prior First Deployment Metaproperty Event Notification received by the Extensible Metaproperty Service 420c subscriber from the repliable Deployment Metaproperty Topic 433. A repliable topic can be defined as capable of accepting a reply-back notification from a subscriber, in reply-back to a prior notification received by the subscriber from the repliable topic. As will be discussed in greater detail subsequently herein, the Extensible Metaproperty Service 420c can reply-back to the Deployment Metaproperty Topic 433 of the Deployment Event Broker 430b with a Second Deployment Metaproperty Event Notification 504. However, in the example of FIG. 5, prior to any replying back, the Deployment Event Broker 430b first publishes the First Deployment Metaproperty Event Notification 502 to the Extensible Metaproperty Service 420c, in response to the Deployment Event Broker 430b consuming the First Deployment Metaproperty Event Notification 501.

The Extensible Metaproperty Service 420c can generate a Deployment Metaproperty Workflow Processing Request 511 in response to the First Deployment Metaproperty Notification 502. The Deployment Metaproperty Workflow Processing Request 511 can include the Initial Application Component Metaproperty.

In response to the Deployment Metaproperty Workflow Processing Request 511, the Deployment Metaproperty Workflow Processor 420e can process the Deployment Metaproperty Workflow 429, so as to process the Initial Application Component Metaproperty of the First Metaproperty Payload into the Processed Application Component Metaproperty, to be included in the Second Metaproperty Payload. The Extensible Metaproperty Service 420c can be in communication with the Deployment Metaproperty Workflow Processor 420e to determine whether the Deployment Metaproperty Workflow Processor 420e is finished processing the Deployment Metaproperty Workflow 429 (e.g. whether the Deployment Metaproperty Workflow Processor 420e is finished processing the Initial Application Component Metaproperty into the Processed Application Component Metaproperty.) For example, this may be accomplished with Deployment Metaproperty Workflow Processor 420e setting a flag of occurrence for the Extensible Metaproperty Service 420c, or by the Deployment Metaproperty Workflow Processor 420e issuing some sort of notification or notification message.

As shown in the example of FIG. 5, the Extensible Metaproperty Service 420c can generate a Second Deployment Metaproperty Event Notification 503 in response to an occurrence of the Deployment Metaproperty Workflow Processor 420e finishing processing of the Deployment Metaproperty Workflow 429 (e.g. generate the Second Deployment Metaproperty Event Notification 503 in response to an occurrence of the Workflow Processor 420e finishing processing the Initial Application Component Metaproperty into the Processed Application Component Metaproperty.) The Second Deployment Metaproperty Event Notification 503 includes the second metaproperty payload. The second metaproperty payload includes the Processed Application Component Metaproperty. As mentioned previously, example Deployment Metaproperty Schema 434 of Deployment Metaproperty Topic 433 of Deployment Event Broker 430b can use a data structure having a variable-length element like a property array, or in this case a processed metaproperty array (e.g. key-value pair) for storing the Processed Application Component Metaproperty of the Second Payload, as shown for example in FIG. 5

As mentioned previously, the Deployment Metaproperty Topic 433 of the Deployment Event Broker 430b can be repliable. The Extensible Metaproperty Service 420c can reply back to the Deployment Metaproperty Topic 433 of the Deployment Event Broker 430b with the Second Deployment Metaproperty Event Notification 503 including the Second Metaproperty Payload. In turn, the Deployment Metaproperty Topic 433 of the Deployment Event Broker 430b can reply back to the Deployment Metaproperty Manager 420b with the Second Deployment Metaproperty Event Notification 504 including the second metaproperty payload. Accordingly, in addition to being capable of accepting a reply back notification from a subscriber, the Deployment Metaproperty Topic 433 is also capable of sending a reply back notification to a generator/producer, in reply back to a prior notification received by the topic from the generator/producer. For example, the Deployment Metaproperty Topic 433 can reply back to the Deployment Metaproperty Manager 420b with the Second Deployment Metaproperty Event Notification 504, in reply back to the prior First Deployment Metaproperty Event Notification received by the Deployment Metaproperty Topic 433 from the Deployment Metaproperty Manager 420b, as generator/producer of the First Deployment Metaproperty Event Notification.

While an example manner of implementing the system 100 is illustrated in FIGS. 1A-1C, and an example manner of implementing the blueprints 202-208 and an example manner of implementing the multimachine service 210 is illustrated in FIG. 2, and an example manner of implementing installation 300 is illustrated in FIG. 3, and an example manner of implementing virtual appliance 320, Deployment Metaproperty Virtual Appliance 324, Deployment Metaproperty Manager Service 420b, Deployment Event Broker 430b Deployment Metaproperty Workflow Processor 420e and Catalog Item Application Component Properties and Metaproperties Database 460b is illustrated in FIGS. 4A-4G, and an example manner of operating the Deployment Metaproperty Virtual Appliance 324 is illustrated in FIG. 5, one or more of the elements, processes and/or devices illustrated in these foregoing figures may be combined, divided, re-arranged, omitted, eliminated and/or implemented in any other way.

Further, the example application 102, 102a, the example deployment environment 104, the example application director 106, the example virtual infrastructure navigator 108, the example cloud provider 110, the example deployment environments 112, the example VMs 114, the example containers 114a, the example topology generator 120, the example deployment plan generator 122, the example deployment director 124, the example blueprint 126, 127, the example deployment plans 128, the example catalog database 130, the example cloud interface 132, the example central package repository 134, the example blueprint display 135, the example cloud manager 138, the example blueprint manager 140, the example distributed execution managers 146A, 146B, the example application component 150, the example initial application component properties 154a, the example initial virtual machine naming properties 156a, the example initial virtual machine addressing properties 157a, the example initial virtual machine resource allocation properties 158a, the example applied deployment metaproperty policy 159, the example visual depiction of application component 160, and/or, more generally, the example system 100 of FIGS. 1A-1C may be implemented by hardware, software, firmware and/or any combination of hardware, software and/or firmware.

Thus, for example, any of the example application 102, 102a, the example deployment environment 104, the example application director 106, the example virtual infrastructure navigator 108, the example cloud provider 110, the example deployment environments 112, the example VMs 114, the example containers 114a, the example topology generator 120, the example deployment plan generator 122, the example deployment director 124, the example blueprints 126, 127, the example deployment plans 128, the example catalog 130, the example cloud interface 132, the example central package repository 134, the example blueprint display 135, the example cloud manager 138, the example blueprint manager 140, the example distributed execution managers 146A, 146B, the example application component 150, the example initial application component properties 154a, the example initial virtual machine naming properties 156a, the example initial virtual machine addressing properties 157a, the example initial virtual machine resource allocation properties 158a, the example applied deployment metaproperty policy 159, the example visual depiction of application component 160, and/or, more generally, the example system 100 of FIGS. 1A-1C could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, the example blueprints 202, 206, 208, the example servers 210A, 210B, 210C, and/or, more generally, the example multi-machine blueprints of FIG. 2 may be implemented by hardware, software, firmware and/or any combination of hardware, software and/or firmware. Thus, for example, any of the example blueprints 202, 206, 208, the example servers 210A, 210B, 210C, and/or, more generally, the example multi-machine blueprints of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, the example load balancer 310, the example Virtual Appliances 320, 322, the example Deployment Metaproperty Virtual Appliance 324, the example Component Servers 330a-336a, 330b-336b, the example Management Endpoints 340-344, the example Management Agents 350a-356a, 350b-356b and/or, more generally, the example installation 300 of FIG. 3 may be implemented by hardware, software, firmware and/or any combination of hardware, software and/or firmware. Thus, for example, any of the example load balancer 310, the example Virtual Appliances 320, 322, the example Deployment Metaproperty Virtual Appliance 324, the example Component Servers 330a-336a, 330b-336b, the example Management Endpoints 340-344, the example Management Agents 350a-356a, 350b-356b and/or, more generally, the example installation 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, the example Service Provisioner 410a, example Service Provisioner 410b, example Orchestrator 420a, example Deployment Metaproperty Manager Service 420b, example Deployment Metaproperty Event Record 422, example Deployment Metaproperty Event Information 423, example Deployment Metaproperty Event Notification Generator 424, example Deployment Metaproperty Timer 425, example Deployment Metaproperty Processor 426, example Extensible Metaproperty Service 420c, example Plugin 420d, example Deployment Metaproperty Workflow Processor 420e, example Deployment Metaproperty Workflow Communications Manager 427, example Deployment Metaproperty Workflow Execution Unit 428, example Deployment Metaproperty Workflow 429, example Event Broker 430a, example Deployment Event Broker 430b, example Deployment Event Subscription Manager 431, example Deployment Event Topic Registry 432, example Deployment Metaproperty Topic 433, example Deployment Metaproperty Schema 434, example Authentication Provider 440a, example Authentication Provider 440b, example Proxy 450a, example Proxy 450b, example Database 460a, example Catalog Item Application Component Properties and Metaproperties Database 460b, example Application Component 150, example Initial Application Component Properties 154a, example Initial Application Component Metaproperties 154b, example Processed Application Component Metaproperties 154c, example Processed Application Component Properties 154d, example Applied Deployment Metaproperty Policy 159, example Initial Virtual Machine Naming Properties 156a, example Initial Virtual Machine Addressing Properties 157a, example Initial Virtual Machine Resource Allocation Properties 158a, example Initial Virtual Machine Naming Metaproperty 156b, example Initial Virtual Machine Addressing Metaproperty 157b, example Initial Virtual Machine Resource Allocation Metaproperty 158b, example Processed Virtual Machine Naming Metaproperty 156c, example Processed Virtual Machine Addressing Metaproperty 157c, example Processed Virtual Machine Resource Allocation Metaproperty 158c, example Processed Virtual Machine Naming Properties 156d, example Processed Virtual Machine Addressing Properties 157d, example Processed Virtual Machine Resource Allocation Properties 158d and/or, more generally, example Virtual Appliance 320 and example Deployment Metaproperty Virtual Appliance 324 of FIGS. 4A-4G may be implemented by hardware, software, firmware and/or any combination of hardware, software and/or firmware.

Thus, for example, any of the example Service Provisioner 410a, example Service Provisioner 410b, example Orchestrator 420a, example Deployment Metaproperty Manager Service 420b, example Deployment Metaproperty Event Record 422, example Deployment Metaproperty Event Information 423, example Deployment Metaproperty Event Notification Generator 424, example Deployment Metaproperty Timer 425, example Deployment Metaproperty Processor 426, example Extensible Metaproperty Service 420c, example Plugin 420d, example Deployment Metaproperty Workflow Processor 420e, example Deployment Metaproperty Workflow Communications Manager 427, example Deployment Metaproperty Workflow Execution Unit 428, example Deployment Metaproperty Workflow 429, example Event Broker 430a, example Deployment Event Broker 430b, example Deployment Event Subscription Manager 431, example Deployment Event Topic Registry 432, example Deployment Metaproperty Topic 433, example Deployment Metaproperty Schema 434, example Authentication Provider 440a, example Authentication Provider 440b, example Proxy 450a, example Proxy 450b, example Database 460a, example Catalog Item Application Component Properties and Metaproperties Database 460b, example Application Component 150, example Initial Application Component Properties 154a, example Initial Application Component Metaproperties 154b, example Processed Application Component Metaproperties 154c, example Processed Application Component Properties 154d, example Applied Deployment Metaproperty Policy 159, example Initial Virtual Machine Naming Properties 156a, example Initial Virtual Machine Addressing Properties 157a, example Initial Virtual Machine Resource Allocation Properties 158a, example Initial Virtual Machine Naming Metaproperty 156b, example Initial Virtual Machine Addressing Metaproperty 157b, example Initial Virtual Machine Resource Allocation Metaproperty 158b, example Processed Virtual Machine Naming Metaproperty 156c, example Processed Virtual Machine Addressing Metaproperty 157c, example Processed Virtual Machine Resource Allocation Metaproperty 158c, example Processed Virtual Machine Naming Properties 156d, example Processed Virtual Machine Addressing Properties 157d, example Processed Virtual Machine Resource Allocation Properties 158d and/or, more generally, example Virtual Appliance 320 and example Deployment Metaproperty Virtual Appliance 324 of FIGS. 4A-4G could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, example Deployment Metaproperty Manager Service 420b, example Deployment Event Broker 430b, example Extensible Metaproperty Service 420c, example Plugin 420d, example Deployment Metaproperty Workflow Processor 420e, example Consume First Deployment Metaproperty Event Notification 501, example Publish First Deployment Metaproperty Event Notification 502, example Reply Back With Second Deployment Metaproperty Event Notification 503, example Reply Back With Second Deployment Metaproperty Event Notification 504, example Metaproperty Workflow Processing Request 511 and/or example manner of operating the Deployment Metaproperty Virtual Appliance 324 as in FIG. 5 may be implemented by hardware, software, firmware and/or any combination of hardware, software and/or firmware.

Thus, for example, any of the example Deployment Metaproperty Manager Service 420b, example Deployment Event Broker 430b, example Extensible Metaproperty Service 420c, example Plugin 420d, example Deployment Metaproperty Workflow Processor 420e, example Consume First Deployment Metaproperty Event Notification 501, example Publish First Deployment Metaproperty Event Notification 502, example Reply Back With Second Deployment Metaproperty Event Notification 503, example Reply Back With Second Deployment Metaproperty Event Notification 504, example Metaproperty Workflow Processing Request 511 and/or example manner of operating the Deployment Metaproperty Virtual Appliance 324 as in FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of example application 102, 102a, the example application director 106, the example cloud provider 110, the example deployment environments 112, the example VMs 114, the example containers 114a, the example topology generator 120, the example deployment plan generator 122, the example deployment director 124, the example blueprint 126, the example deployment plans 128, the example catalog database 130, the example cloud interface 132, the example central package repository 134, the example blueprint display 135, the example cloud manager 138, the example blueprint manager 140, the example distributed execution managers 146A, 146B, the example application component 150, the example initial application component properties 154a, the example initial virtual machine naming properties 156a, the example initial virtual machine addressing properties 157a, the example initial virtual machine resource allocation properties 158a, the example applied deployment metaproperty policy 159, the example visual depiction of application component 160, and/or, more generally, the example system 100, example blueprints 202, 206, 208, the example servers 210A, 210B, 210C, and/or, more generally, the example multi-machine blueprints of FIG. 2 example load balancer 310, the example Virtual Appliances 320, 322, the example Deployment Metaproperty Virtual Appliance 324, the example Component Servers 330a-336a, 330b-336b, the example Management Endpoints 340-344, the example Management Agents 350a-356a, 350b-356b and/or, more generally, the example installation 300 of FIG. 3, example Service Provisioner 410a, example Service Provisioner 410b, example Orchestrator 420a, example Deployment Metaproperty Manager Service 420b, example Deployment Metaproperty Event Record 422, example Deployment Metaproperty Event Information 423, example Deployment Metaproperty Event Notification Generator 424, example Deployment Metaproperty Timer 425, example Deployment Metaproperty Processor 426, example Extensible Metaproperty Service 420c, example Plugin 420d, example Deployment Metaproperty Workflow Processor 420e, example Deployment Metaproperty Workflow Communications Manager 427, example Deployment Metaproperty Workflow Execution Unit 428, example Deployment Metaproperty Workflow 429, example Event Broker 430a, example Deployment Event Broker 430b, example Deployment Event Subscription Manager 431, example Deployment Event Topic Registry 432, example Deployment Metaproperty Topic 433, example Deployment Metaproperty Schema 434, example Authentication Provider 440a, example Authentication Provider 440b, example Proxy 450a, example Proxy 450b, example Database 460a, example Catalog Item Application Component Properties and Metaproperties Database 460b, example Application Component 150, example Initial Application Component Properties 154a, example Initial Application Component Metaproperties 154b, example Processed Application Component Metaproperties 154c, example Processed Application Component Properties 154d, example Applied Deployment Metaproperty Policy 159, example Initial Virtual Machine Naming Properties 156a, example Initial Virtual Machine Addressing Properties 157a, example Initial Virtual Machine Resource Allocation Properties 158a, example Initial Virtual Machine Naming Metaproperty 156b, example Initial Virtual Machine Addressing Metaproperty 157b, example Initial Virtual Machine Resource Allocation Metaproperty 158b, example Processed Virtual Machine Naming Metaproperty 156c, example Processed Virtual Machine Addressing Metaproperty 157c, example Processed Virtual Machine Resource Allocation Metaproperty 158c, example Processed Virtual Machine Naming Properties 156d, example Processed Virtual Machine Addressing Properties 157d, example Processed Virtual Machine Resource Allocation Properties 158d and/or, more generally, example Virtual Appliance 320 and example Deployment Metaproperty Virtual Appliance 324 of FIGS. 4A-4G, example Deployment Metaproperty Manager Service 420b, example Deployment Event Broker 430b, example Extensible Metaproperty Service 420c, example Plugin 420d, example Deployment Metaproperty Workflow Processor 420e, example Consume First Deployment Metaproperty Event Notification 501, example Publish First Deployment Metaproperty Event Notification 502, example Reply Back With Second Deployment Metaproperty Event Notification 503, example Reply Back With Second Deployment Metaproperty Event Notification 504, example Metaproperty Workflow Processing Request 511 and/or example manner of operating the Deployment Metaproperty Virtual Appliance 324 as in FIG. 5 is/are hereby expressly defined to include a tangible computer readable storage device or storage disk such as a memory, a digital versatile disk (DVD), a compact disk (CD), a Blu-ray disk, etc. storing the software and/or firmware.

Further still, the example system 100 of FIGS. 1A-1C, and the example blueprints 202-208 and the example multimachine service 210 of FIG. 2, and the example installation 300 of FIG. 3, and the example virtual appliance 320 and the example Deployment Metaproperty Virtual Appliance 324, the example Deployment Metaproperty Manager Service 420b and the example deployment event broker 430b of FIGS. 4A-4G and the example Deployment Metaproperty Event Notification system 500 of FIG. 5 may include one or more elements, processes and/or devices in addition to, or instead of, those illustrated in these foregoing figures, and/or may include more than one of any or all of the illustrated elements, processes and devices.

Figure 6A:
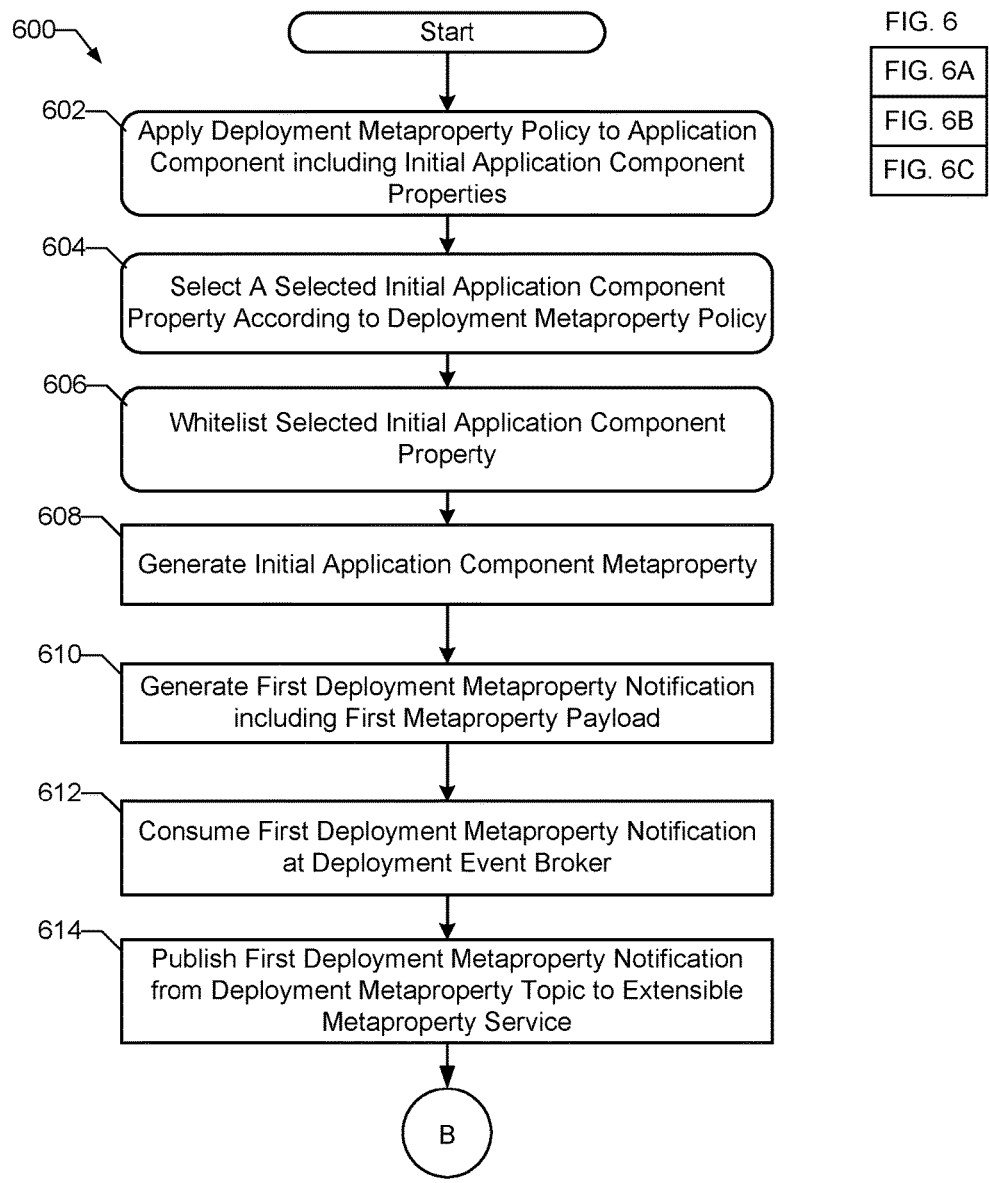
FIGS. 6A-6C is a flowchart representative of example of machine readable instructions which may be executed to implement an example Deployment Metaproperty Virtual Appliance of FIGS. 4B-4G to manage a metaproperty in deployment customization of an application for deployment in an application deployment environment of a cloud computing platform provider.
Figure 6B:
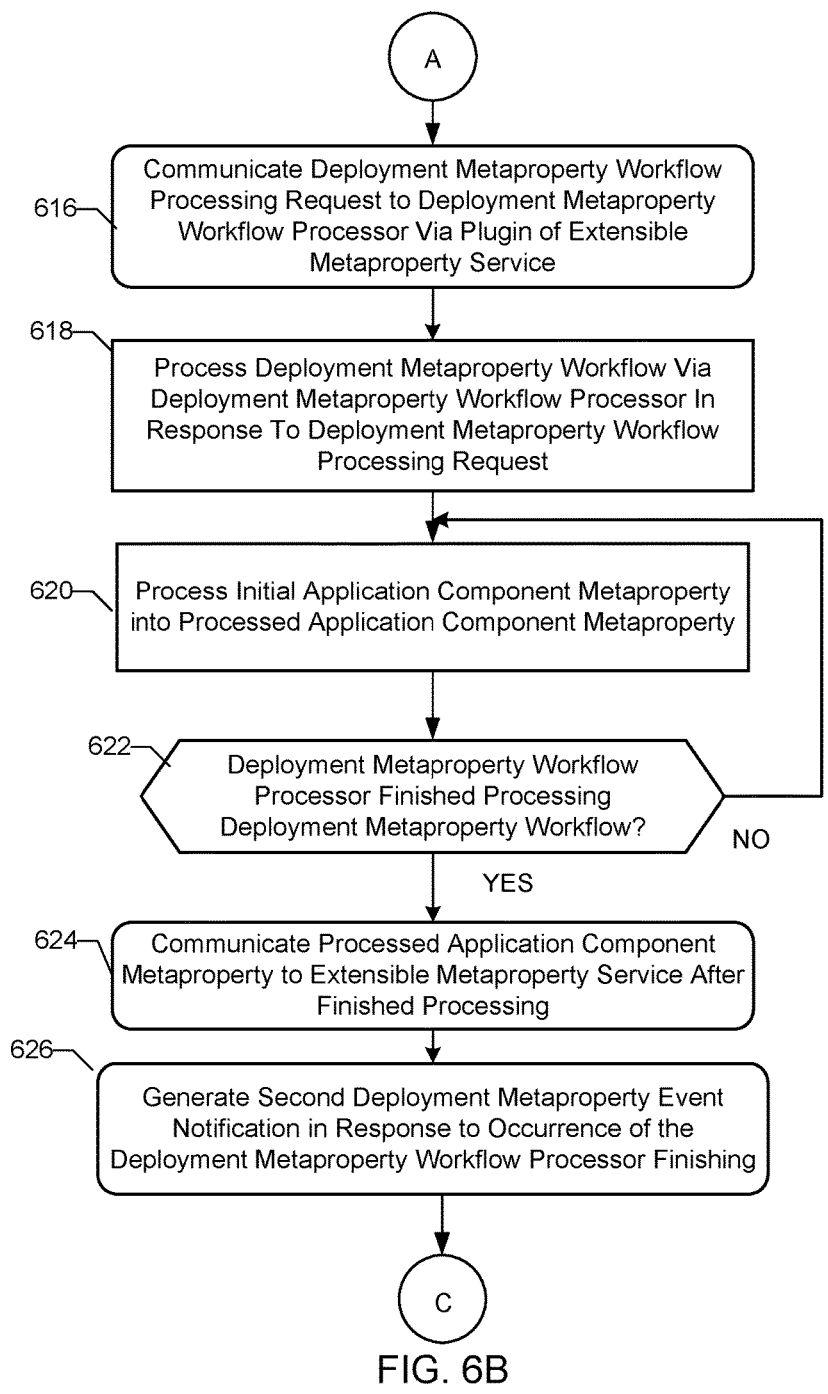
Figure 6C:
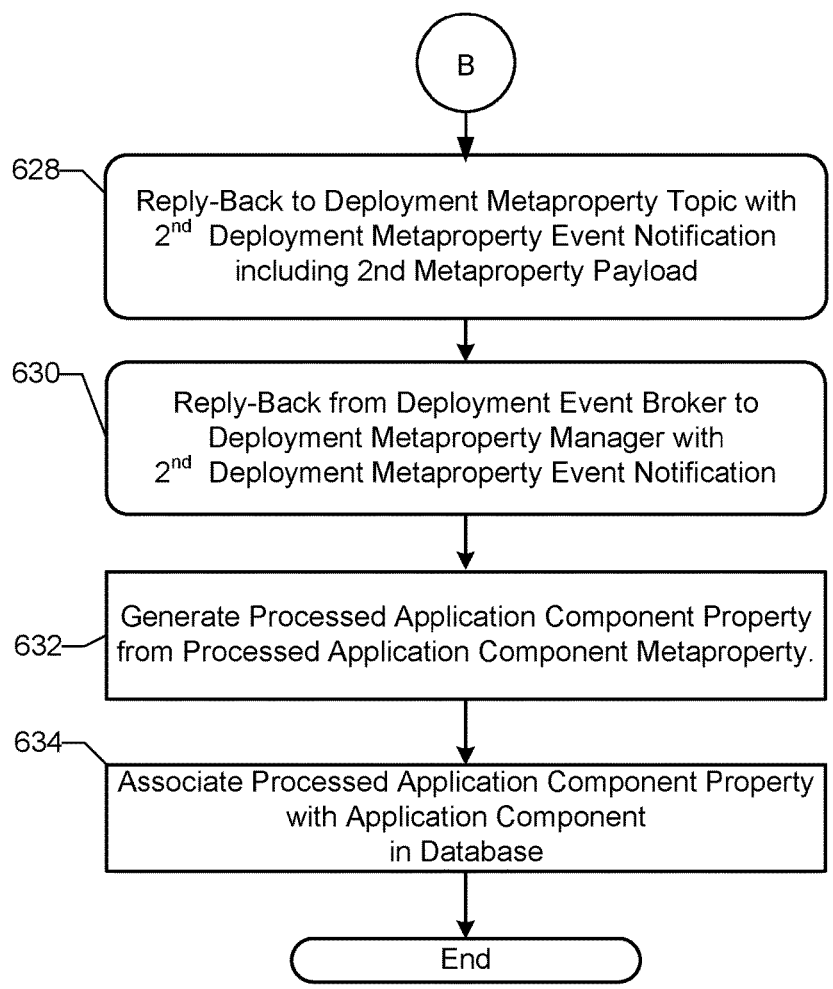

Example flowcharts representative of example machine readable instructions which may be executed to implement the example Deployment Metaproperty Virtual Appliance 324 of FIGS. 4B-4G to manage deployment customization of an application for deployment in an application deployment environment of a cloud computing platform provider are shown in the flowchart of FIGS. 6A-6C.

In these examples, the machine readable instructions implement programs for execution by a processor such as the processor 712 shown in the example processor platform 700 discussed below in connection with FIG. 7. The programs may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowchart illustrated in FIGS. 6A-6C, many other methods of managing customizations via metaproperty in accordance with the teachings of this disclosure may alternatively be used. For example, the order of execution of the blocks may be changed, and/or some of the blocks described may be changed, eliminated, or combined.

As mentioned above, the example processes of FIGS. 6A-6C may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 6A-6C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

A flowchart representative of example machine readable instructions which may be executed to implement the example Deployment Metaproperty Virtual Appliance 324 of FIGS. 4B-4G to manage deployment customization of an application for deployment in an application deployment environment of a cloud computing platform provider are shown in FIGS. 6A-6C. FIGS. 6A-6C depict a first flowchart representative of computer readable instructions that may be executed to implement the example Deployment Metaproperty Virtual Appliance 324 of FIGS. 4B-4G to manage deployment customization of an application for deployment in an application deployment environment of a cloud computing platform provider. An example program 600 is illustrated beginning in FIG. 6A. Initially at block 602, at least one processor executes an instruction to apply a deployment metaproperty policy to an application component that provides a logical template of an application for deployment in an application deployment environment of a cloud computing provider. The application component includes a plurality of initial application component properties associated with the application. The at least one processor executes an instruction to select a selected initial application component property, based on the deployment metaproperty policy (block 604). The selected initial application component metaproperty is whitelisted (block 606). The at least one processor executes an instruction to generate an initial application component metaproperty from the selected initial application component property (block 608).

For example, an example deployment metaproperty policy can be applied to the Application Component 150 in the database 460b (e.g. Applied Deployment Metaproperty Policy 159.) The example deployment metaproperty manager 420b can generate the initial application component metaproperty, for example via the Deployment Metaproperty Processor 426 and the Applied Deployment Metaproperty Policy 159. Generating the initial application component metaproperty can include whitelisting a respective one of the initial application component properties 154a. For example, via the Deployment Metaproperty Processor 426, the Deployment Metaproperty Manager 420 can select from among the plurality of Initial Application Component Properties 154a to whitelist into the Initial Application Component Metaproperty, in accordance with the Applied Deployment Metaproperty Policy 159. The initial application component property can include at least one of: an initial virtual machine naming property, an initial virtual machine addressing property, and an initial virtual machine resource allocation property. The initial application component metaproperty can include at least one of: an initial virtual machine naming metaproperty, an initial virtual machine addressing metaproperty, and an initial virtual machine resource allocation metaproperty.

In another example, the Initial Application Component Metaproperty can be a plurality of Initial Application Component Metaproperties 154b. The deployment metaproperty policy is applied to the Application Component 150 in the database 460b (e.g. Applied Deployment Metaproperty Policy 159). The Deployment Metaproperty Manager 420 can select from among the plurality of Initial Application Component Properties 154a to whitelist into the Initial Application Component Metaproperties 154b in accordance with the deployment metaproperty policy 159. The Initial Application Component Metaproperties 154b can include at least one of: an initial virtual machine naming metaproperty, an initial virtual machine addressing metaproperty, and an initial virtual machine resource allocation metaproperty. In yet another example, the selected initial application component property can be a first selected grouping of initial application component properties. The generating of the initial application component metaproperty can include whitelisting the first selected grouping of initial application component properties to generate the initial application component metaproperty. For example, the Deployment Metaproperty Manager 420 can select the first selected grouping of initial application component properties to whitelist into the initial application component metaproperty. For example, the Deployment Metaproperty Manager 420 can use wildcards and/or have multiple sub-values in a value field, which can be separated by a pre-defined symbol, to select the first selected grouping of initial application component properties to whitelist into the initial application component metaproperty.

In the example of FIG. 6A, in accordance with flowchart of example program 600, a First Deployment Metaproperty Event Notification is generated that includes a First Metaproperty Payload (block 610). The First Metaproperty Payload includes the Initial Application Component Metaproperty. The First Deployment Metaproperty Event Notification from the Deployment Metaproperty Manager is consumed at a deployment event broker (block 612). For example, The Deployment Metaproperty Event Notification Generator 424 of the Deployment Metaproperty Manager 420b can generate a First Deployment Metaproperty Event Notification in response to a Deployment Metaproperty Event Record 422 that records Deployment Metaproperty Event Information 423 about a deployment metaproperty event occurrence. The first Deployment Metaproperty Event Notification can include Deployment Metaproperty Event Information 423, and can include a First Metaproperty Payload including the Initial Application Component Metaproperty. For example, the Deployment Metaproperty Event Notification Generator 424 of the Deployment Metaproperty Manager Service 420b can submit the First Deployment Metaproperty Event Notification to the Deployment Metaproperty Topic 433 of the Deployment Event Broker 430b for publication to the Extensible Metaproperty Service 420c. The Deployment Event Broker 430b can consume the First Deployment Metaproperty Event Notification 501 submitted by the Deployment Metaproperty Manager Service 420b. Authentication provider 440b can authenticate access to the Deployment Event Broker 430b.

In the example of FIG. 6A, in accordance with flowchart of example program 600, the first deployment metaproperty event notification can be published from a deployment metaproperty topic of the deployment event broker to an extensible metaproperty service (block 614). For example, the Deployment Event Broker 430b shown in FIG. 4B, and shown in greater detail in FIG. 4D can include a Deployment Event Subscription Manager 431, a Deployment Metaproperty Topic Registry 432 and a Deployment Metaproperty Topic 433. The Deployment Metaproperty Topic 433 can include a Deployment Metaproperty Schema 434. The Deployment Event Broker 430b includes a Deployment Metaproperty Topic 433 to publish the First Deployment Metaproperty Event Notification 502 to the Extensible Metaproperty Service 420c, in response to the Deployment Event Broker 430b consuming the First Deployment Metaproperty Event Notification 501. The Extensible Metaproperty Service 420c can include a Plugin 420d to facilitate extensibility of the Extensible Metaproperty Service 420c.

In the example of FIG. 6B, in accordance with flowchart of example program 600, the Extensible Metaproperty Service can communicate a Deployment Metaproperty Workflow Processing Request to a Deployment Metaproperty Workflow Processor via the Plug-In Extensible Metaproperty Service (block 616). This can include communicating the initial application component metaproperty from the extensible metaproperty service to a deployment metaproperty workflow processor. For example, the Extensible Metaproperty Service 420c can include at least one Plugin 420d so as to facilitate extensibility of the Extensible Metaproperty Service 420c. The Deployment Metaproperty Workflow Processor 420e can be employed to process a deployment metaproperty workflow 429. The Plugin 420d of the Extensible Metaproperty Service 420c can facilitate communication between the Extensible Metaproperty Service 420c and the Deployment Metaproperty Workflow Processor 420e. The Extensible Metaproperty Service 420c can generate a Deployment Metaproperty Workflow Processing Request 511 in response to the First Deployment Metaproperty Notification 502. The Deployment Metaproperty Workflow Processing Request 511 can include the Initial Application Component Metaproperty.

In the example of FIG. 6B, in accordance with flowchart of example program 600, the Deployment Metaproperty Workflow Processor can process a Deployment Metaproperty Workflow in response to the Deployment Metaproperty Workflow Processing Request (block 618). This can include processing the Initial Application Component Metaproperty into the processed Application Component Metaproperty (block 620). For example, the Deployment Metaproperty Workflow Processor 420e can process the Deployment Metaproperty Workflow 429 to process the Initial Application Component Metaproperty of the First Metaproperty Payload into the Processed Application Component Metaproperty to be included in the Second Metaproperty Payload. As mentioned previously, the Initial Application Component Metaproperty of the First Metaproperty Payload can include at least one of an Initial Virtual Machine Naming Metaproperty, an Initial Virtual Machine Addressing Metaproperty, and an Initial Virtual Machine Resource Allocation Metaproperty. The Processed Application Component Metaproperty of the Second Metaproperty Payload can include at least one of a Processed Virtual Machine Naming Metaproperty, a Processed Virtual Machine Addressing Metaproperty, and a Processed Virtual Machine Resource Allocation Metaproperty. The Deployment Metaproperty Workflow Processor 420e can process the Deployment Metaproperty Workflow 429 in response to the Deployment Metaproperty Workflow Processing Request 511. The Deployment Metaproperty Workflow 429 can process the Initial Application Component Metaproperty into the Processed Application Component Metaproperty. In another example, the Initial Application Component Metaproperty can be a plurality of Initial Application Component Metaproperties 154b, and the deployment metaproperty workflow processor can process the Initial Application Component Metaproperties 154b into a plurality of Processed Application Component Metaproperties 154c. For example, an Initial Application Component Metaproperty of the First Metaproperty Payload can be processed by the Deployment Metaproperty Workflow Processor 420e into a Processed Application Component Metaproperty to be included in a Second Metaproperty Payload. More particularly, for example, the initial virtual machine naming metaproperty (for example "foo-machine-name") of the First Metaproperty Payload can be processed into the processed virtual machine naming metaproperty (for example "my-foo-machine-name") to be included in the Second Metaproperty Payload. For example, the initial virtual machine addressing metaproperty (for example an address reservation "198.111.111") can be processed into processed virtual machine addressing metaproperty (for example an address reservation "198.999.999"). Similarly, for example, at least one Initial Virtual Machine Resource Allocation Metaproperty of the First Metaproperty Payload can be processed by the Deployment Metaproperty Workflow Processor 420e into at least one Processed Virtual Machine Resource Allocation Metaproperty to be included in the Second Metaproperty Payload. For example, the Initial Virtual Machine Memory Allocation Metaproperty (for example "4 Gigabytes of Memory") of the First Metaproperty Payload can be processed into the Processed Virtual Machine Memory Allocation Metaproperty (for example "2 Gigabytes of Memory") to be included in the Second Metaproperty Payload. For example, the Initial Virtual Machine Central Processing Unit (CPU) Allocation Metaproperty (for example "4 CPUs") of the First Metaproperty Payload can be processed into the Processed Virtual Machine Central Processing Unit (CPU) Allocation Metaproperty (for example "2 CPU's") to be included in the Second Metaproperty Payload.

In the example of FIG. 6B, in accordance with flowchart of example program 600, at block 622 the Deployment Metaproperty Workflow Processor determines whether the Deployment Metaproperty Workflow Processor is finished processing the Deployment Metaproperty Workflow (e.g. processing the Initial Application Component Metaproperty into the Processed Application Component Metaproperty.) If the Deployment Metaproperty Workflow Processor determines that the processing of the Deployment Metaproperty Workflow is finished (e.g. processing the Initial Application Component Metaproperty into the Processed Application Component Metaproperty is finished), then execution of example program 600 continues at block 624.

In the example of FIG. 6B, in accordance with flowchart of example program 600, at block 634 the Deployment Metaproperty Workflow Processor communicates the Processed Application Component Metaproperty to the Extensible Metaproperty Service, after the Deployment Metaproperty Workflow Processor is finished processing the Deployment Metaproperty Workflow (e.g. is finished processing the Initial Application Component Metaproperty into the Processed Application Component Metaproperty.) For example, the Extensible Metaproperty Service 420c can be in communication with the Deployment Metaproperty Workflow Processor 420e to determine whether the Deployment Metaproperty Workflow Processor 420e is finished processing the Deployment Metaproperty Workflow 429 (e.g. whether the Deployment Metaproperty Workflow Processor 420e is finished processing the Initial Application Component Metaproperty into the Processed Application Component Metaproperty.) The Deployment Metaproperty Workflow Processor 420e can respond to the Extensible Metaproperty Service 420c with the Processed Application Component Metaproperty to be included in the Second Metaproperty Payload, after the Deployment Metaproperty Workflow Processor 420e finishes processing of the Deployment Metaproperty Workflow 429 (e.g. after the Deployment Metaproperty Workflow Processor 420e is finished processing the Initial Application Component Metaproperty into the Processed Application Component Metaproperty.)

In the example of FIG. 6B, in accordance with flowchart of example program 600, at block 626 the Extensible Metaproperty Service generates a Second Deployment Metaproperty Event Notification in response to an occurrence of the Deployment Metaproperty Workflow Processor finishing processing the Initial Application Component Metaproperty into the Processed Application Component Metaproperty. The Second Deployment Metaproperty Event Notification includes a Second Metaproperty Payload. The Second Metaproperty Payload includes the Processed Application Component Metaproperty. For example, the Extensible Metaproperty Service 420c can generate a Second Deployment Metaproperty Event Notification 503 in response to an occurrence of the Deployment Metaproperty Workflow Processor 420e finishing processing of the Deployment Metaproperty Workflow 429 (e.g. generate the Second Deployment Metaproperty Event Notification 503 in response to an occurrence of the Workflow Processor 420e finishing processing the Initial Application Component Metaproperty into the Processed Application Component Metaproperty.) The Second Deployment Metaproperty Event Notification 503 includes the second metaproperty payload. The second metaproperty payload includes the Processed Application Component Metaproperty.

In the example of FIG. 6C, in accordance with flowchart of example program 600, at block 628 the Extensible Metaproperty Service replies-back to the Deployment Metaproperty Topic of the Deployment Event Broker with the Second Deployment Metaproperty Event Notification including the Second Metaproperty Payload. The Second Metaproperty Payload includes the Processed Application Component Metaproperty. For example, the Deployment Metaproperty Topic 433 of the Deployment Event Broker 430b can be repliable. The Extensible Metaproperty Service 420c can reply-back to the Deployment Metaproperty Topic 433 of the Deployment Event Broker 430b with the Second Deployment Metaproperty Event Notification 503 including the Second Metaproperty Payload.

In the example of FIG. 6C, in accordance with flowchart of example program 600, at block 630 the Deployment Event Broker can reply-back to the Deployment Metaproperty Manager with the Second Deployment Metaproperty Event Notification including the Second Metaproperty Payload. The Second Metaproperty Payload includes the Processed Application Component Metaproperty. For example, the Deployment Metaproperty Topic 433 of the Deployment Event Broker 430b can reply-back to the Deployment Metaproperty Manager 420b with the Second Deployment Metaproperty Event Notification 504 including the Second Metaproperty Payload.

In the example of FIG. 6C, in accordance with flowchart of example program 600, at block 632, the Deployment Metaproperty Manager can generate an application component property from the processed application component metaproperty. For example, the Deployment Metaproperty Manager 420b can generate a Processed Application Component Property from the Processed Application Component Metaproperty. In another example, the Processed Application Component Metaproperty can be a plurality of Processed Application Component Metaproperties 154c, and the deployment metaproperty manager can generate a plurality of Processed Application Component Properties 154d from the Plurality of Processed Application Component Metaproperties 154c.

In the example of FIG. 6C, in accordance with flowchart of example program 600, at block 634, the Deployment Metaproperty Manager can associate the Application Component with the Processed Application Component Property in a database. For example, the deployment metaproperty manager 420b can associate the Application Component 150 with the Processed Application Component Property. In the example of FIG. 4G, the resulting Processed Application Component Property can be associated and/or included with the Application Component 150 in the Catalog Item Application Component Properties and Metaproperties Database 460b. The Application Component 150 can provide a logical template of Application 102, 102a for deployment in an Application Deployment Environment 112. The Catalog Item Application Component Properties and Metaproperties Database 460b can include the Application Component 150 to provide the logical template of the Application 102, 102a.

In another example, the Processed Application Component Property can be a plurality of Processed Application Component Properties 154d. The Deployment Metaproperty Manager can associate the Application Component 150 with the plurality of Processed Application Component Properties 154d. For example, the Processed Application Component Properties 154d can be associated and/or included with the Application Component 150 in the Catalog Item Application Component Properties and Metaproperties Database 460b. After executing block 634, execution of example program 600 can end.

Although the example program 600 of FIGS. 6A-6C is described in connection with managing deployment customization of an application for deployment in an application deployment environment of a cloud computing platform provider, the example program 600 of FIGS. 6A-6C implemented in accordance with the teachings of this disclosure can be used in a multi-user scenario in which hundreds or thousands of users obtain deployment customization using metaproperties from Cloud Provider 110. For example, while manually managing deployment customizations in a manual fashion for such quantities of users would be overly burdensome or near impossible within required time constraints, examples disclosed herein may be used to process deployment customizations via metaproperty and using the operations and Deployment Metaproperty Virtual Appliance 324 to manage deployment customizations via metaproperty and deploy large quantities of virtual machines 114 and/or containers 114a in an efficient and streamlined fashion without burdening and frustrating end users with long customization times to access such virtual machines 114 and/or containers 114a.

Figure 7:
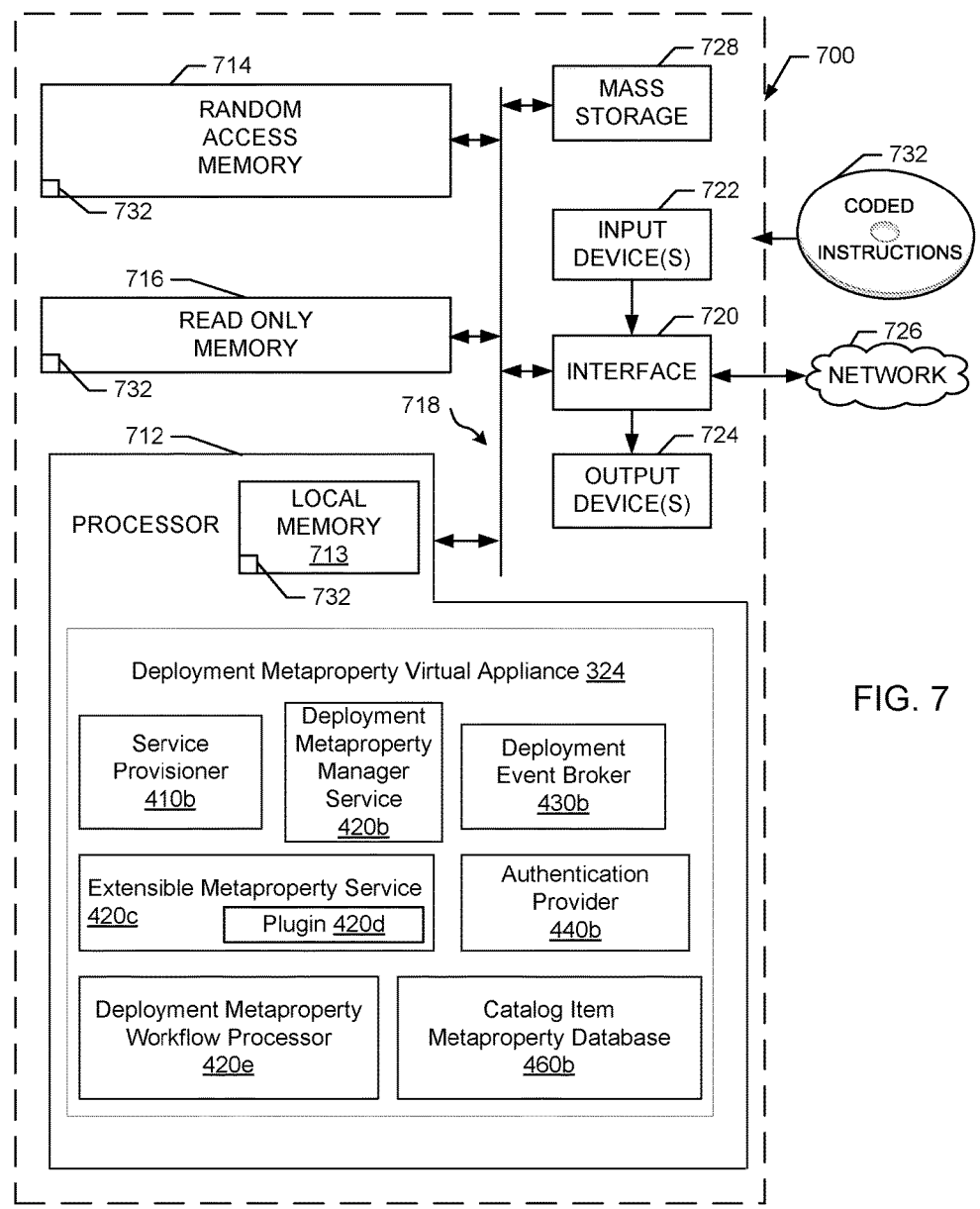
FIG. 7 is a block diagram of an example processing platform capable of executing the example machine-readable instructions of the flowchart of FIGS. 6A-6C to implement the example Deployment Metaproperty Virtual Appliance of FIGS. 4B-4G.

FIG. 7 is a block diagram of an example processor platform 700 capable of executing the instructions of the flowchart of FIGS. 6A-6C to implement the example Deployment Metaproperty Virtual Appliance of FIGS. 4B-4G. The processor platform 700 of the illustrated example includes a processor 712. The processor 712 of the illustrated example is hardware employing virtualization. For example, the processor 712 can be implemented by one or more integrated circuits, logic circuits, microprocessors or controllers from any desired family or manufacturer. As already discussed in detail previously herein, the hardware of processor 712 is virtualized using virtualization such as VMs and/or containers. In the example of FIG. 7, the Deployment Metaproperty Virtual Appliance 324 may be implemented by one or more VM's or containers, so as to virtualize the hardware of processor 712. In the example of FIG. 7, the Deployment Metaproperty Virtual Appliance 324 includes Service Provisioner 410b, Deployment Metaproperty Manager Service 420b, Extensible Metaproperty Service 420c including Plugin 420d, Deployment Metaproperty Workflow Processor 420e, Deployment Event Broker 430b, Authentication Provider 440b and Catalog Item Metaproperty Database 460b.

The processor 712 of the illustrated example includes a local memory 713 (e.g., a cache), and executes instructions to implement the example operations and management component 406 or portions thereof. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include flash devices, floppy disk drives, hard drive disks, optical compact disk (CD) drives, optical Blu-ray disk drives, RAID systems, and optical digital versatile disk (DVD) drives.

Coded instructions 732 representative of the example machine readable instructions of FIGS. 6A-6C may be stored in the mass storage device 728, in the volatile memory 714, in the non-volatile memory 716, and/or on a removable tangible computer readable storage medium such as a CD or DVD.

Copending U.S. patent application entitled "Apparatus and Methods to Incorporate External System to Approve Deployment Provisioning", filed on the same day as the present application, by Boris Savov, Rostislav Georgiev, Lazarin Lazarov, Ventsyslav Raikov and Ivanka Baneva is hereby incorporated by reference herein in its entirety. Copending U.S. patent application entitled "Methods and Apparatus for Event-Based Extensibility of System Logic", filed on the same day as the present application, by Boris Savov, Igor Stoyanov and Rostislav Georgiev is hereby incorporated by reference herein in its entirety.

The various aspects, features and/or implementations as disclosed above can be used alone or in various combinations. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a database including an application component that provides a logical template of an application, the application component including a plurality of initial application component properties associated with the application;
a hardware processor;
a deployment metaproperty manager to:
generate an initial application component metaproperty, the initial application component metaproperty whitelisting a respective one of the initial application component properties; and
generate a first deployment metaproperty event notification in response to a deployment metaproperty event record that records deployment metaproperty event information about a deployment metaproperty event occurrence, the first deployment metaproperty event notification including a first metaproperty payload, the first metaproperty payload including the initial application component metaproperty; and
a deployment event broker to consume the first deployment metaproperty event notification from the deployment metaproperty manager, the deployment event broker including a deployment metaproperty topic to publish the first deployment metaproperty event notification to an extensible metaproperty service in response to the deployment event broker consuming the first deployment metaproperty event notification, at least one of the deployment metaproperty manager and the deployment event broker implemented on the hardware processor.

2. An apparatus as defined in claim 1, wherein the initial application component metaproperty includes at least one of:
   an initial virtual machine naming metaproperty,
   an initial virtual machine addressing metaproperty; and
   an initial virtual machine resource allocation metaproperty.

3. An apparatus as defined in claim 1, wherein the extensible metaproperty service includes at least one plugin to facilitate extensibility of the extensible metaproperty service.

4. An apparatus comprising:
   a database including an application component that provides a logical template of an application, the application component including a plurality of initial application component properties associated with the application;
   a hardware processor;
   a deployment metaproperty manager to:
      generate an initial application component metaproperty, the initial application component metaproperty whitelisting a respective one of the initial application component properties; and
      generate a first deployment metaproperty event notification in response to a deployment metaproperty event record that records deployment metaproperty event information about a deployment metaproperty event occurrence, the first deployment metaproperty event notification including a first metaproperty payload, the first metaproperty payload including the initial application component metaproperty; and
   a deployment event broker to consume the first deployment metaproperty event notification from the deployment metaproperty manager, the deployment event broker to reply back to the deployment metaproperty manager with a second deployment metaproperty event notification including a second metaproperty payload, the second metaproperty payload including the processed application component metaproperty, at least one of the deployment metaproperty manager and the deployment event broker implemented on the hardware processor.

5. An apparatus as defined in claim 4, wherein the deployment metaproperty manager is to generate a processed application component property from the processed application component metaproperty.

6. A method of managing application properties of an application for deployment in an application deployment environment of a cloud computing provider, the method comprising:
   applying, by executing an instruction with at least one processor, a deployment metaproperty policy to an application component that provides a logical template of the application, the application component including a plurality of initial application component properties associated with the application;
   selecting, by executing an instruction with the at least one processor, a selected initial application component property based on the deployment metaproperty policy;
   generating, by executing an instruction with the at least one processor, an initial application component metaproperty from the selected initial application component property;
   generating a first deployment metaproperty event notification that includes a first metaproperty payload, the first metaproperty payload including the initial application component metaproperty;
   consuming the first deployment metaproperty event notification at a deployment event broker; and
   publishing the first deployment metaproperty event notification from a deployment metaproperty topic of the deployment event broker to an extensible metaproperty service.

7. A method as defined in claim 6, wherein the generating of the initial application component metaproperty includes whitelisting the selected initial application component property to generate the initial application component metaproperty.

8. A method as defined in claim 6, wherein the generating of the first deployment metaproperty event notification is in response to a deployment metaproperty event record that records deployment metaproperty information about a deployment metaproperty event occurrence.

9. A method comprising:
   applying, by executing an instruction with at least one processor, a deployment metaproperty policy to an application component that provides a logical template of the application, the application component including a plurality of initial application component properties associated with the application;
   selecting, by executing an instruction with the at least one processor, a selected initial application component property based on the deployment metaproperty policy;
   generating, by executing an instruction with the at least one processor, an initial application component metaproperty from the selected initial application component property;
   generating a first deployment metaproperty event notification that includes a first metaproperty payload, the first metaproperty payload including the initial application component metaproperty;
   consuming the first deployment metaproperty event notification from a deployment metaproperty manager at a deployment event broker; and
   replying back from the deployment event broker to the deployment metaproperty manager with a second deployment metaproperty event notification including the second metaproperty payload, the second metaproperty payload including the processed application component metaproperty.

10. A method as defined in claim 9, further comprising generating an application component property from the processed application component metaproperty.

11. A tangible computer-readable storage medium comprising machine readable instructions which, when executed, cause a logic circuit to at least:
   apply a deployment metaproperty policy to an application component that provides a logical template of an application to be deployed in an application deployment environment of a cloud computing provider, the application component including a plurality of initial application component properties associated with the application;

select from among the plurality of initial application component properties a selected initial application component property according to the deployment metaproperty policy;

generate an initial application component metaproperty from the selected initial application component property;

generate a first deployment metaproperty event notification including a first metaproperty payload, the first metaproperty payload including the initial application component metaproperty;

publish the first deployment metaproperty event notification from a deployment metaproperty topic of a deployment event broker; and reply back from the deployment event broker to a deployment metaproperty manager with a second deployment metaproperty event notification including a second metaproperty payload, the second metaproperty payload including the processed application component metaproperty.

12. The storage medium as defined in claim 11, wherein the instructions to cause the logic circuit to generate the initial application component metaproperty include instructions to whitelist the selected initial application component property.

13. The storage medium as defined in claim 11, wherein the instructions are to cause the logic circuit to process the initial application component metaproperty into a processed application component metaproperty.

14. The storage medium as defined in claim 11, wherein the instructions are to cause the logic circuit to generate a processed application component property from the processed application component metaproperty.

* * * * *